United States Patent
Kaminade et al.

(10) Patent No.: US 9,664,804 B2
(45) Date of Patent: *May 30, 2017

(54) APPROACHING VEHICLE DETECTION APPARATUS AND DRIVE ASSIST SYSTEM

(71) Applicant: TOYOTA JIDOSHA KABUSHIKI KAISHA, Aichi-ken (JP)

(72) Inventors: Takuya Kaminade, Susono (JP); Shinya Kawamata, Mishima (JP); Osamu Ozaki, Mishima (JP); Akira Nagae, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,266

(22) Filed: May 31, 2016

(65) Prior Publication Data
US 2016/0274253 A1 Sep. 22, 2016

Related U.S. Application Data

(63) Continuation of application No. 14/403,055, filed as application No. PCT/JP2012/063549 on May 25, 2012, now Pat. No. 9,421,969.

(51) Int. Cl.
*G01V 1/00* (2006.01)
*G01S 3/86* (2006.01)
(Continued)

(52) U.S. Cl.
CPC .............. *G01V 1/001* (2013.01); *B60K 6/40* (2013.01); *B60L 3/12* (2013.01); *B60W 10/06* (2013.01);
(Continued)

(58) Field of Classification Search
CPC .......... G01V 1/001; G01S 3/86; G08G 1/163; G08G 1/166; B60W 20/17; B60W 10/06;
(Continued)

(56) References Cited

U.S. PATENT DOCUMENTS 6,137,436 A 10/2000 Koch
7,237,641 B2 * 7/2007 Yanai ..................... G08G 1/167
180/271
(Continued)

FOREIGN PATENT DOCUMENTS

JP 05-092767 U 12/1993
JP 09-128697 A 5/1997
(Continued)

*Primary Examiner* — Calvin Cheung
(74) *Attorney, Agent, or Firm* — Sughrue Mion, PLLC

(57) ABSTRACT

An approaching vehicle detection apparatus includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; and a vehicle state changing unit configured to change a vehicle state of the own vehicle to a vehicle state where the own vehicle sound is able to be suppressed when the own vehicle sound generated from the own vehicle is able to be suppressed by changing the vehicle state of the own vehicle.

10 Claims, 21 Drawing Sheets

(51) Int. Cl.
*G08G 1/16* (2006.01)
*B60L 3/12* (2006.01)
*B60W 10/06* (2006.01)
*B60W 20/40* (2016.01)
*B60W 30/18* (2012.01)
*B60W 20/17* (2016.01)
*B60K 6/40* (2007.10)
*B60W 10/08* (2006.01)
*B60W 20/10* (2016.01)
*B60W 30/09* (2012.01)

(52) U.S. Cl.
CPC ............ *B60W 10/08* (2013.01); *B60W 20/10* (2013.01); *B60W 20/17* (2016.01); *B60W 20/40* (2013.01); *B60W 30/09* (2013.01); *B60W 30/18009* (2013.01); *G01S 3/86* (2013.01); *G08G 1/163* (2013.01); *G08G 1/166* (2013.01); *B60W 2420/54* (2013.01); *B60W 2550/20* (2013.01); *B60Y 2200/92* (2013.01); *Y10S 903/93* (2013.01); *Y10S 903/951* (2013.01)

(58) Field of Classification Search
CPC ...... B60W 10/08; B60W 20/10; B60W 20/40; B60W 30/09; B60W 30/18009; B60K 6/40; B60L 3/12
See application file for complete search history.

(56) References Cited

U.S. PATENT DOCUMENTS

| | | | | |
|---|---|---|---|---|
| 7,346,191 B2* | 3/2008 | Sano | ................. | G06K 9/00805 348/208.14 |
| 8,031,085 B1 | 10/2011 | Anderson | | |
| 8,036,424 B2* | 10/2011 | Ishikawa | ................. | G06T 7/004 382/103 |
| 2002/0097884 A1 | 7/2002 | Cairns | | |
| 2003/0210807 A1 | 11/2003 | Sato et al. | | |
| 2005/0280519 A1* | 12/2005 | Nagata | ..................... | B60Q 5/00 340/435 |
| 2006/0204039 A1 | 9/2006 | Maemura et al. | | |
| 2007/0280051 A1 | 12/2007 | Novick et al. | | |
| 2008/0181419 A1* | 7/2008 | Goldstein | ............... | H04R 3/002 381/57 |
| 2009/0285409 A1* | 11/2009 | Yoshizawa | ............ | G01S 3/8083 381/92 |
| 2010/0053333 A1 | 3/2010 | Schutte et al. | | |
| 2010/0214086 A1* | 8/2010 | Yoshizawa | ............... | G01S 3/801 340/435 |
| 2010/0228482 A1* | 9/2010 | Yonak | ................... | G01S 3/8083 701/301 |
| 2011/0175755 A1* | 7/2011 | Yoshioka | .............. | G01S 3/8083 340/995.1 |
| 2012/0230504 A1* | 9/2012 | Kuroda | ................ | G10K 11/178 381/71.4 |
| 2013/0188794 A1 | 7/2013 | Kawamata et al. | | |
| 2013/0328701 A1* | 12/2013 | Sato | ....................... | G01S 3/808 340/943 |
| 2014/0136096 A1* | 5/2014 | Funayama | ........... | G01S 3/8083 701/300 |
| 2014/0241126 A1* | 8/2014 | Funayama | ............ | G01S 3/808 367/129 |
| 2015/0092051 A1 | 4/2015 | Furukawa | | |

FOREIGN PATENT DOCUMENTS

| | | | | |
|---|---|---|---|---|
| JP | 2000-098015 A | 4/2000 | | |
| JP | 2000-105274 A | 4/2000 | | |
| JP | 2000113395 A | 4/2000 | | |
| JP | 2009-051333 A | 3/2009 | | |
| JP | 2011-173470 A | 9/2011 | | |
| JP | 2011-225212 A | 11/2011 | | |
| JP | 2011-233090 A | 11/2011 | | |
| JP | 2011232293 A | 11/2011 | | |
| WO | WO 2013/041942 A1 * | 3/2013 | ............ | G01S 3/808 |

* cited by examiner

APPROACHING VEHICLE DETECTION APPARATUS AND DRIVE ASSIST SYSTEM

CROSS REFERENCE TO RELATED APPLICATIONS

The present application is a Continuation of application Ser. No. 14/403,055, filed Dec. 9, 2014, which is a National Stage of International Application No. PCT/JP2012/063549, filed May 25, 2012, the contents of all of which are incorporated herein by reference in their entirety.

FIELD

The present invention relates to an approaching vehicle detection apparatus that detects a vehicle approaching an own vehicle and a drive assist system that assists a driver of the own vehicle based on the detected approaching vehicle.

BACKGROUND

Conventionally, there has been known an approaching vehicle detection apparatus that detects a vehicle approaching an own vehicle. For example, Patent Literatures 1 and 2 below disclose a technique of detecting an approaching vehicle and calculating the approaching direction of the approaching vehicle based on a sound signal detected by a plurality of microphones of an own vehicle. Further, Patent Literature 3 below discloses a technique of using a microphone installed in a different place in response to a vehicle speed of an own vehicle when an approaching vehicle is detected and the approaching direction thereof is detected. Further, Patent Literature 4 below discloses a drive assist technique of detecting the other vehicle existing in an area serving as a blind angle with respect to an own vehicle in an intersection point or the like and notifying the existence of the approaching vehicle to a driver when the other vehicle is a vehicle approaching the own vehicle.

CITATION LIST

Patent Literature

Patent Literature 1: Japanese Utility Model Application Laid-open No. 5-92767
Patent Literature 2: Japanese Laid-open Patent Publication No. 2000-105274
Patent Literature 3: Japanese Laid-open Patent Publication No. 9-128697
Patent Literature 4: Japanese Laid-open Patent Publication No. 2000-098015

SUMMARY

Technical Problem

Incidentally, in the case where the vehicle approaching the own vehicle is detected based on the sound information of the environment therearound, a sound (hereinafter, also referred to as the "other vehicle sound") generated from the approaching vehicle as the detection object of the microphone is obtained. Also, the other sound (hereinafter, referred to as an "own vehicle sound") such as a traveling sound (mainly an engine sound) of the own vehicle or the sound of the environment of the own vehicle is also obtained as a noise. Therefore, it is desirable to remove the noise other than the sound generated from the detection object in the case where the approaching vehicle is detected. For example, in the techniques of Patent Literatures 1 and 2, a noise component other than the detection object is removed by a filter or the like from the detected sound signal. Further, in the technique of Patent Literature 3, when the vehicle speed is low, it is determined whether the other vehicle approaches the own vehicle based on the sound collected by the microphones provided in the front part of the own vehicle. Meanwhile, when the vehicle speed is high, the approaching vehicle is detected by selecting the microphone provided in the rear part of the vehicle at the side corresponding to the turn direction (the right or left direction) indicated by an operation of a turn signal switch. That is, in the technique of Patent Literature 3, the sound is collected by the microphone disposed in response to the vehicle speed of the own vehicle, and the approaching of the other vehicle is determined based on the sound information, thereby reducing the influence of the noise such as the wind sound or the engine sound of the own vehicle. However, since the own vehicle sound is generated as the sound of the frequency bandwidth equal to the detection object, it is difficult to remove the own vehicle sound from the detected sound information so that the own vehicle sound is separated from the other vehicle sound of the approaching vehicle in the technique of Patent Literatures 1 and 2. Further, the technique of Patent Literature 3 may reduce the influence of the own vehicle sound, but the own vehicle sound is not separated from the detected sound information at all times. Thus, in the approaching vehicle detection apparatus of the related art, for example, even when the approaching vehicle may be detected with high precision when the own vehicle sound is small, there is a concern that the approaching vehicle detection precision may be degraded when the own vehicle sound increases, and hence the approaching vehicle detection performance is not stabilized. Accordingly, there is a possibility that the approaching vehicle detection apparatus of the related art may give a trouble to the driver during the drive assist.

Therefore, the invention is made to solve such problems of the related arts, and an object thereof is to provide an approaching vehicle detection apparatus and a drive assist system capable of reducing a trouble on a driver.

Solution to Problem

To achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; and a vehicle state changing unit configured to change a vehicle state of the own vehicle to a vehicle state where the own vehicle sound is able to be suppressed when the own vehicle sound generated from the own vehicle is able to be suppressed by changing the vehicle state of the own vehicle.

It is preferable that the vehicle state changing unit is configured to suppress the own vehicle sound by changing the vehicle state of the own vehicle to a travel state only using a power of a motor when the own vehicle is able to travel only by a power of the motor.

Moreover, it is preferable that the vehicle state changing unit is configured to suppress the own vehicle sound by stopping an engine when the engine is able to be stopped.

Moreover, to achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; and a detection prohibition unit configured to prohibit the detection for the sound source or the determination on whether the approaching vehicle exists when the own vehicle sound generated from the own vehicle is not able to be suppressed.

It is preferable that the detection prohibition unit is configured to prohibit the detection for the sound source or the determination on whether the approaching vehicle exists when the own vehicle is not able to travel only by a power of a motor.

Moreover, it is preferable that the detection prohibition unit is configured to prohibit the detection for the sound source or the determination on whether the approaching vehicle exists when an engine is not able to be stopped.

Moreover, to achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; and a noise removal process unit configured to perform a noise removal process on the sound information detected by the sound information detection unit or the sound information involving with the sound source detected by the sound source detection unit when an own vehicle sound generated from the own vehicle is not able to be suppressed and not to perform a noise removal process on the sound information when the own vehicle sound generated from the own vehicle is able to be suppressed, wherein when the noise removal process is performed on the sound information detected by the sound information detection unit, the sound source detection unit is configured to detect the sound source around the own vehicle based on the sound information subjected to the noise removal process, and wherein when the noise removal process is performed on the sound information involving with the sound source detected by the sound source detection unit, the approaching vehicle determination unit is configured to determine whether the sound source subjected to the noise removal process is a vehicle approaching the own vehicle.

Moreover, to achieve the above-described object, the present invention includes: a sound information detection unit configured to detect sound information around an own vehicle; a sound source detection unit configured to detect a sound source around the own vehicle based on the detected sound information; and an approaching vehicle determination unit configured to determine whether the sound source is a vehicle approaching the own vehicle, wherein when an own vehicle sound generated from the own vehicle is not able to be suppressed, a determination that the approaching vehicle exists is not easily made compared to the case where the own vehicle sound is able to be suppressed.

It is preferable that when the own vehicle is not able to travel only by a power of a motor and the own vehicle sound is not able to be suppressed, a determination that the approaching vehicle exists is not easily made compared to the case where the own vehicle travels only by the power of the motor.

Moreover, it is preferable that when an engine is not able to be stopped and the own vehicle sound is not able to be suppressed, a determination that the approaching vehicle exists is not easily made compared to the case where the engine is stopped.

Moreover, to achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; and a vehicle state changing unit configured to change a vehicle state of the own vehicle to a vehicle state suitable for detecting the approaching vehicle when the vehicle state of the current own vehicle is not suitable for detecting the approaching vehicle.

Moreover, to achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; and a detection prohibition unit configured to prohibit the detection for the sound source or the determination on whether the approaching vehicle exists when the vehicle state of the current own vehicle is not suitable for detecting the approaching vehicle.

Moreover, to achieve the above-described object, the present invention includes: a sound information detection unit configured to detect sound information around an own vehicle; a sound source detection unit configured to detect a sound source around the own vehicle based on the detected sound information; and an approaching vehicle determination unit configured to determine whether the sound source is a vehicle approaching the own vehicle, wherein when the vehicle state of the current own vehicle is not suitable for detecting the approaching vehicle, a determination that the approaching vehicle exists is not easily made compared to the case where the vehicle state is suitable for detecting the approaching vehicle.

The case which is not suitable for detecting the approaching vehicle indicates a case where the vehicle state of the current own vehicle is an engine operation state, and the case which is suitable for detecting the approaching vehicle indicates a case where the vehicle state of the current own vehicle is an engine stop state, a case where the own vehicle travels only by a power of a motor, or a case where the own vehicle is able to travel only by the power of the motor.

Moreover, to achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; and a drive assist control unit configured to perform a drive assist of the own vehicle based on the determination result of the approaching vehicle determination unit, wherein when an own vehicle sound generated from the own vehicle is not able to be suppressed, any one of the detection of the sound source, the determination on whether the approaching vehicle exists, and the drive assist is prohibited.

Moreover, to achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; a noise removal process unit configured to perform a noise removal process on the sound information detected by the sound information detection unit or the sound information involving with the sound source detected by the sound source detection unit when an own vehicle sound generated from the own vehicle is not able to be suppressed and does not perform a noise removal process on the sound information when the own vehicle sound generated from the own vehicle is able to be suppressed; and a drive assist control unit configured to perform a drive assist of the own vehicle based on the determination result of the approaching vehicle determination unit, wherein when the noise removal process is performed on the sound information detected by the sound information detection unit, the sound source detection unit is configured to detect the sound source around the own vehicle based on the sound information subjected to the noise removal process, and wherein when the noise removal process is performed on the sound information involving with the sound source detected by the sound source detection unit, the approaching vehicle determination unit is configured to determine whether the sound source subjected to the noise removal process is a vehicle approaching the own vehicle.

Moreover, to achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; a drive assist control unit configured to perform a drive assist of the own vehicle based on the determination result of the approaching vehicle determination unit, wherein when an own vehicle sound generated from the own vehicle is not able to be suppressed, a drive assist level is decreased compared to the case where the own vehicle sound is able to be suppressed.

It is preferable that when the own vehicle is not able to travel only by a power of a motor and the own vehicle sound is not able to be suppressed, the drive assist level is decreased compared to the case where the own vehicle travels only by the power of the motor.

Moreover, it is preferable that when the engine is not able to be stopped and the own vehicle sound is not able to be suppressed, the drive assist level is decreased compared to the case where the engine is stopped.

Moreover, to achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; a drive assist control unit configured to perform a drive assist of the own vehicle based on the determination result of the approaching vehicle determination unit; and an assist prohibition unit configured to prohibit any one of the detection of the sound source, the determination on whether the approaching vehicle exists, and the drive assist when the vehicle state of the current own vehicle is not suitable for detecting the approaching vehicle.

Moreover, to achieve the above-described object, the present invention includes: a sound information detection unit configured to detect sound information around an own vehicle; a sound source detection unit configured to detect a sound source around the own vehicle based on the detected sound information; an approaching vehicle determination unit configured to determine whether the sound source is a vehicle approaching the own vehicle; and a drive assist control unit configured to perform a drive assist of the own vehicle based on the determination result of the approaching vehicle determination unit, wherein when the vehicle state of the current own vehicle is not suitable for detecting the approaching vehicle, a drive assist level is decreased compared to the case where the vehicle state is suitable for detecting the approaching vehicle.

The case which is not suitable for detecting the approaching vehicle indicates a case where the vehicle state of the current own vehicle is an engine operation state, and the case which is suitable for detecting the approaching vehicle indicates a case where the vehicle state of the current own vehicle is an engine stop state, a case where the own vehicle travels only by a power of a motor, or a case where the own vehicle is able to travel only by the power of the motor.

Advantageous Effects of Invention

The approaching vehicle detection apparatus and the drive assist system according to the invention may detect the approaching vehicle with high reliability and may decrease the possibility that the approaching vehicle may be detected with low reliability. Thus, the approaching vehicle detection apparatus and the drive assist system may perform a highly precise drive assist with respect to the approaching vehicle. Further, the approaching vehicle detection apparatus and the drive assist system may perform a drive assist of reducing a trouble on the driver.

DESCRIPTION OF EMBODIMENTS

Hereinafter, an example of an approaching vehicle detection apparatus and a drive assist system according to the invention will be described in detail with reference to the drawings. Furthermore, the invention is not limited to the example.

[Example]

The example of the approaching vehicle detection apparatus and the drive assist system according to the invention will be described with reference to FIGS. 1 to 21.

The approaching vehicle detection apparatus is an apparatus that detects a vehicle (an approaching vehicle) approaching an own vehicle. The approaching vehicle detection apparatus of the example uses a sound source detection device 52 to be described below so as to detect not only the approaching vehicle directly viewed by a driver, but also the approaching vehicle existing in an area (particularly, a blind angle area before and obliquely before the own vehicle) serving as a blind angle with respect to the own vehicle or the driver. Further, the drive assist system is used to assist the driver of the own vehicle during a drive. The drive assist system of the example includes the approaching vehicle detection apparatus and the drive assist device, and assists the drive of the own vehicle based on the positional relation or the like between the approaching vehicle and the own vehicle detected by the approaching vehicle detection apparatus. The operations of the approaching vehicle detection apparatus and the drive assist system are controlled by a drive assist electronic control device (hereinafter, referred to as a "drive assist ECU") 1.

First, the vehicle that employs the approaching vehicle detection apparatus and the drive assist system will be described. The approaching vehicle detection apparatus and the drive assist system of the example are applied to a vehicle including at least a mechanical power source which is able to be stopped in a travel state. The braking/driving force or the like of the vehicle is controlled by a travel control electronic control device (hereinafter, referred to as a "travel control ECU") 2. The travel control ECU 2 is connected to the drive assist ECU 1, and may send and receive an instruction or information therebetween. For example, the drive assist ECU 1 and the travel control ECU 2 are connected to each other via a Controller Area Network (CAN) bus.

Figure 1:
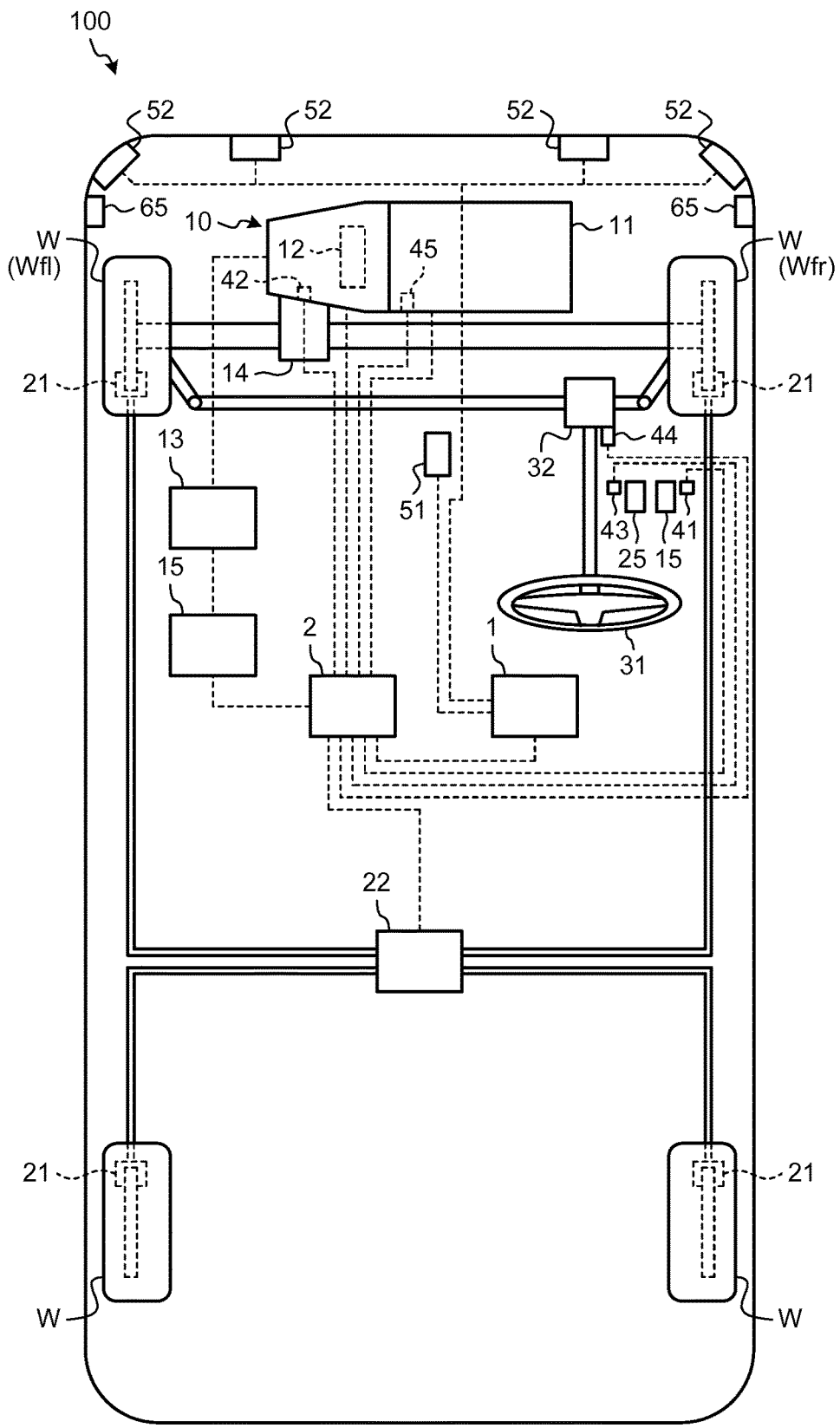
FIG. 1 is a view illustrating an example of a vehicle that employs an approaching vehicle detection apparatus and a drive assist system according to the invention.

In FIG. 1, a vehicle 100 is illustrated. The vehicle 100 includes a hybrid system 10 that includes a mechanical power source and an electric power source. Here, a Front engine Front drive (FF) hybrid vehicle is exemplified.

The mechanical power source is an engine 11 such as an internal combustion engine or an external combustion engine that converts thermal energy into mechanical energy and outputs the mechanical energy. The engine 11 is controlled by the travel control ECU 2, and may output a requested engine torque. The requested engine torque is set based on an operation amount (an accelerator opening degree or the like) of an accelerator pedal 15 of the driver or a request from the vehicle by a vehicle behavior control or the like. The operation amount of the accelerator pedal 15 is detected by an accelerator operation amount detection device 41 such as an accelerator opening degree sensor. The accelerator operation amount detection device 41 is connected to the travel control ECU 2. Here, the travel control ECU 2 may stop the engine 11 in the travel state, and may restart the engine 11 in the travel state.

The electric power source is a motor that converts electric energy into mechanical energy and outputs the mechanical energy or an electric generator that converts electric energy into mechanical energy and vice versa. In this example, an electric generator 12 is used which is operated as a motor during a powering driving operation and is operated as a generator during a regeneration driving operation. The electric generator 12 is controlled by the travel control ECU 2, and may output a requested motor torque. The requested motor torque is set based on the operation amount (the accelerator opening degree or the like) or the like of the accelerator pedal 15 of the driver or the request from the vehicle by the vehicle behavior control or the like.

The hybrid system 10 includes one engine 11, at least one electric generator 12, a secondary battery 13 which is connected to the electric generator 12 through an inverter (not illustrated), and a power transmission unit 14 which is able to transmit a torque among the power sources and drive wheels Wfl and Wfr. For example, the hybrid system 10 includes two electric generators 12, and each electric generator 12 and the engine 11 are connected to the power transmission unit 14. In this case, the power transmission unit 14 includes a power distribution mechanism (a planetary gear mechanism) of which the rotation components are individually connected to the engine 11 and the electric generator 12. The drive wheels Wfl and Wfr are also connected to the power distribution mechanism. The travel control ECU 2 acquires information on a temperature or a State of Charge (SOC) of the secondary battery 13 through, for example, a battery monitoring unit 15.

In the vehicle 100, the vehicle speed is detected based on the rotation speed of the output shaft of the power transmission unit 14. Thus, a vehicle speed detection device 42 such as a vehicle speed sensor is disposed so as to detect such as the rotation speed or the rotation angle of the output shaft. The vehicle speed detection device 42 is connected to the travel control ECU 2.

The vehicle 100 is provided with an engine mode in which the vehicle travels only by the power of the engine 11, an EV mode in which the vehicle travels like an electric vehicle (EV) only by the power of the electric generator 12, and a hybrid mode in which the vehicle travels by the power of the engine 11 and the power of the electric generator 12. The travel control ECU 2 controls such as the engine 11 or the electric generator 12 in response to the selected travel mode.

Further, the vehicle 100 includes a brake device 21 which generates a brake force in each vehicle wheel W by the hydraulic pressure of the brake fluid and a brake oil pressure control device 22 which serves as a hydraulic actuator capable of controlling the hydraulic pressure supplied to the brake device 21 in each vehicle wheel W. The brake oil pressure control device 22 may directly output a master cylinder pressure in response to the operation amount of a brake pedal 25, and may output the master cylinder pressure while the master cylinder pressure is increased or decreased in response to the instruction of the travel control ECU 2. The operation amount of the brake pedal 25 is detected by a brake operation amount detection device 43 such as a pedal opening degree sensor. The brake operation amount detection device 43 is connected to the travel control ECU 2.

Further, the vehicle 100 is provided with a steering wheel 31 which is operated when the driver turns the steering wheels Wfl and Wfr and an electric power steering (EPS) device 32 which is interposed between the steering wheel 31 and the steering wheels Wfl and Wfr. The electric power steering device 32 is controlled by the travel control ECU 2. The vehicle 100 is provided with a steering angle detection device (a steering angle sensor or the like) 44 which detects the steering angle of the steering wheel 31. The steering angle detection device 44 is connected to the travel control ECU 2.

In the vehicle 100, the drive assist ECU 1 and the environment information detection device detecting the environment information around the own vehicle constitute a part of the configuration of the approaching vehicle detection apparatus. The environment information mentioned herein includes information on a moving object such as the other vehicle (including not only a four-wheeled vehicle, but also a two-wheeled vehicle), a pedestrian, or a bicycle, information on a road mark (a stop line or the like), information on a traffic sign, information on the travel road of the own vehicle, and information on a road (hereinafter, referred to as a "cross road") intersecting the travel road of the own vehicle in the forward direction. For example, the vehicle 100 includes the environment information detection device as an imaging device 51 and a sound source detection device 52. Further, the vehicle 100 is provided with an own vehicle position detection device 53 as the environment information detection device. Here, the own vehicle position detection device of the car navigation system may be used.

Figure 2:
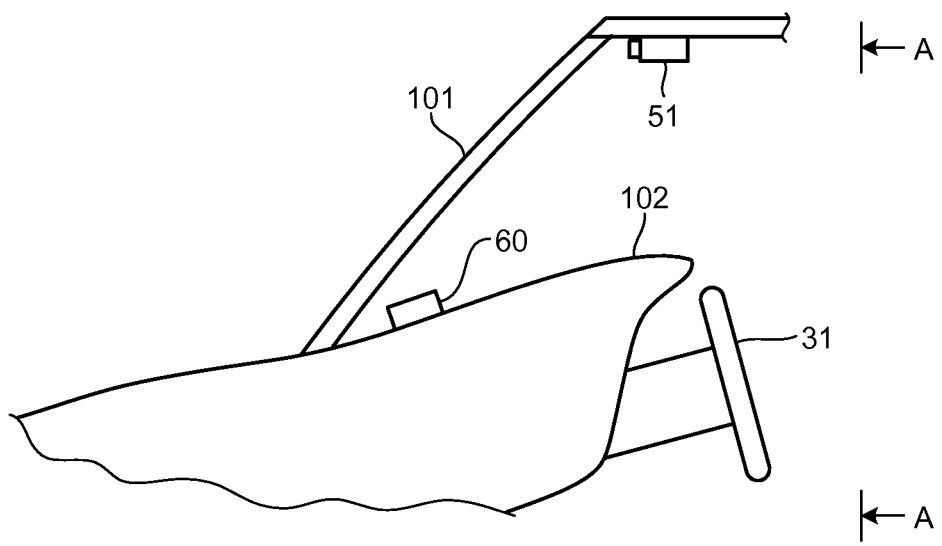
FIG. 2 is a schematic view illustrating the interior of the vehicle illustrated in FIG. 1.

The imaging device 51 may be, for example, a device that captures image information within an imaging range like a Charge-Coupled Device (CCD) camera or may be a direct sensor capable of detecting a detection object within an imaging range where light emitted from the detection object reaches. In the vehicle 100, the imaging device 51 is used to detect the environment information before the own vehicle. Therefore, for example, as illustrated in FIG. 2, the imaging device 51 is disposed at the front part of the roof of the vehicle interior and captures the image before the own vehicle through a front window 101. The detection signal of the imaging device 51 is transmitted to the drive assist ECU 1.

For example, the drive assist ECU 1 may recognize the content indicated by the road mark or the traffic signal by analyzing the detection signal. Further, the drive assist ECU 1 may recognize the existence of the moving object within the imaging range in the forward direction on the travel road of the own vehicle or the existence of the moving object within the imaging range in the forward direction in the cross road based on the detection signal. Then, at that time, the drive assist ECU may also recognize the positional relation of the moving object with respect to the own vehicle (the direction where the moving object exists with respect to the own vehicle, the distance between the own vehicle and the moving object, and the like). Further, the drive assist ECU 1 may recognize the positional relation of a blind angle forming object (a shielding object such as a construction building) causing a blind angle within an imaging range with respect to the own vehicle (the direction where the blind angle forming object exists with respect to the own vehicle, the distance between the own vehicle and the blind angle forming object, and the like) based on the detection signal of the imaging device 51 when a blind angle area exists before the own vehicle in the cross road.

The sound source detection device 52 is a sound information detection unit which is disposed at the front part of the vehicle 100 and detects a sound source existing before and obliquely before the own vehicle along with the sound information around the own vehicle. For example, the sound source detection device 52 is a sound collection microphone or the like. It is desirable that the sound source detection device 52 may detect the direction or the position of the sound source with respect to the own vehicle. Therefore, the sound source detection device 52 is disposed at a plurality of positions at the front part of the own vehicle. In the example of FIG. 1, the plurality of sound source detection devices 52 are disposed at a front end and a corner of a front bumper. The detection signal of the sound source detection device 52 is transmitted to the drive assist ECU 1.

For example, the drive assist ECU 1 may recognize the direction or the position of the sound source with respect to the own vehicle based on the detection signals of the respective sound source detection devices 52. Further, even when the sound source exists in the blind angle area of the own vehicle, the drive assist ECU 1 may recognize the position of the sound source based on the detection signals. Further, the drive assist ECU 1 may also recognize the sound source state (for example, the state whether the moving object exists) of the blind angle area by repeating the detection.

In the vehicle 100, the drive assist device constitutes a part of the configuration of the drive assist system along with the environment information detection device or the drive assist ECU 1 constituting the approaching vehicle detection apparatus.

Figure 3:
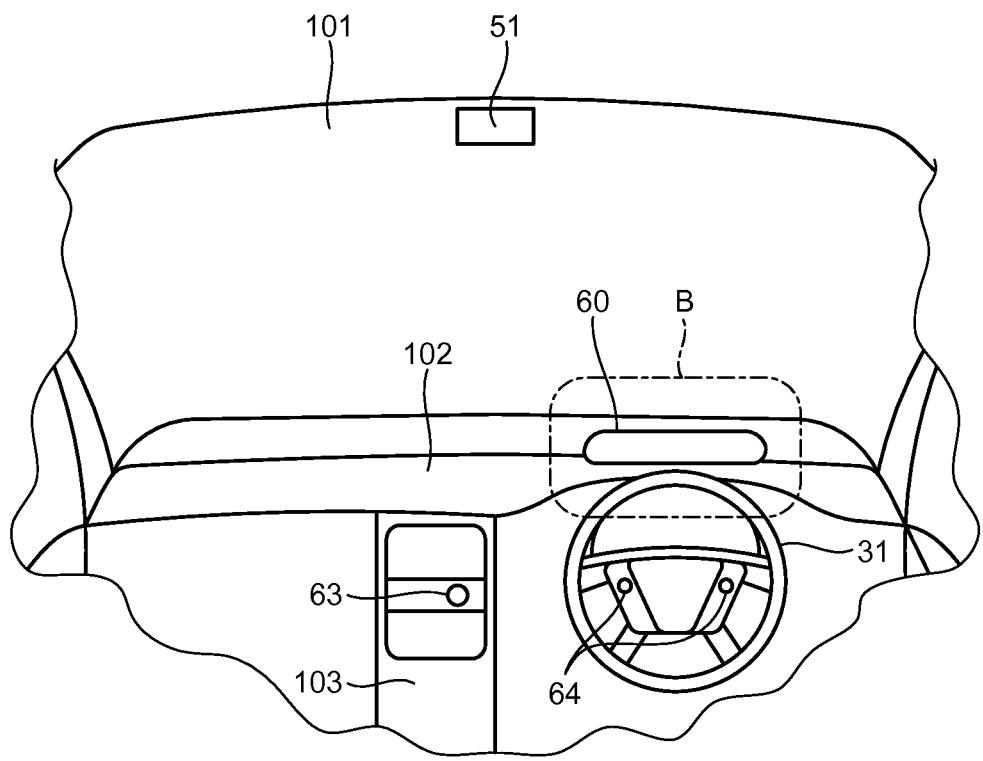
FIG. 3 is a view taken along the line A-A of FIG. 2.
Figure 4:
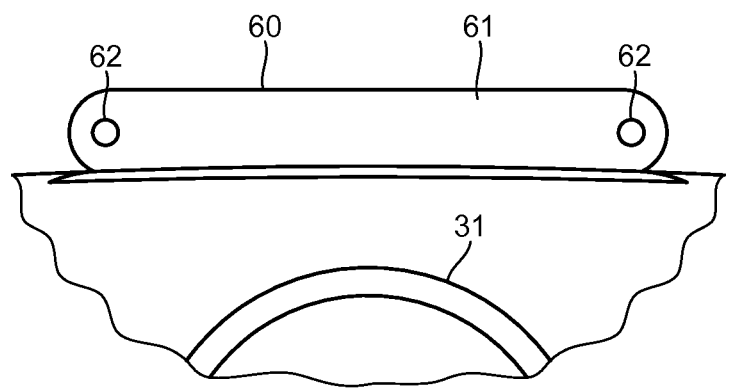
FIG. 4 is a detailed view of a part B of FIG. 3.

The drive assist device of this example assists the driver by notifying predetermined drive assist information to the driver. Therefore, as illustrated in FIGS. 2 and 3, the vehicle interior is provided with an alarm device 60 serving as a drive assist device so as to generate an alarm. The alarm device 60 is disposed in vicinity of the lower end of the front window 101 on a dashboard 102. The alarm device 60 notifies the drive assist information to the driver by stimulating a sense of vision or hearing of the driver or both senses thereof. For example, as illustrated in FIG. 4, the alarm device 60 of this example includes a display unit 61 which displays the drive assist information and a buzzer unit 62 which outputs an alarm sound corresponding to the drive assist information, and assists the drive by stimulating the senses of vision and hearing of the driver. The alarm device 60 of this example invites the attention of the driver by notifying the existence of the approaching vehicle as the drive assist information.

Further, in this example, when there is a concern that the own vehicle and the approaching vehicle may intersect each other, a drive assist may be also performed which prevents the own vehicle and the approaching vehicle from intersecting each other by decelerating the own vehicle with a decrease in engine torque or an increase in brake force. In the case of the engine control, the engine 11 and the travel control ECU 2 serve as the drive assist device. In the case of the brake control, the brake oil pressure control device 22 and the travel control ECU 2 serve as the drive assist device.

The vehicle interior is provided with a mode switching switch 63 which switches the operation mode of the drive assist system. The mode switching switch 63 of this example may switch an automatic mode of automatically operating the drive assist system and a manual mode of turning on or off the operation of the drive assist system by the driver. The mode switching switch 63 is disposed in, for example, an instrument panel 103. The vehicle interior is provided with an on/off switching switch 64 which switches the on/off state of the operation of the drive assist system when the manual mode is selected. The on/off switching switch 64 is disposed in, for example the steering wheel 31.

The drive assist ECU 1 is operated when the mode switching switch 63 is in the automatic mode or the on/off switching switch 64 is turned on, and operates the drive assist device based on the environment around the own vehicle. For example, when an intersection point exists before the own vehicle, the drive assist ECU 1 assists the drive by notifying the existence to the driver by the alarm device 60 or decelerating the own vehicle with a decrease in engine torque or an increase in brake force. Further, when the own vehicle enters the intersection point, the drive assist ECU 1 detects the approaching vehicle on the cross road and the position of the approaching vehicle with respect to the own vehicle, and assists the driver operation by notifying the information of the approaching vehicle to the driver by the alarm device 60 or decelerating the own vehicle with a decrease in engine torque or an increase in brake force.

The vehicle 100 is provided with an alarm lamp 65 which is provided in each side surface of the front bumper. The alarm lamp 65 is used to notify the existence of the own vehicle to the moving object existing obliquely before the own vehicle or before the own vehicle by lighting the alarm lamp 65.

Figure 5:
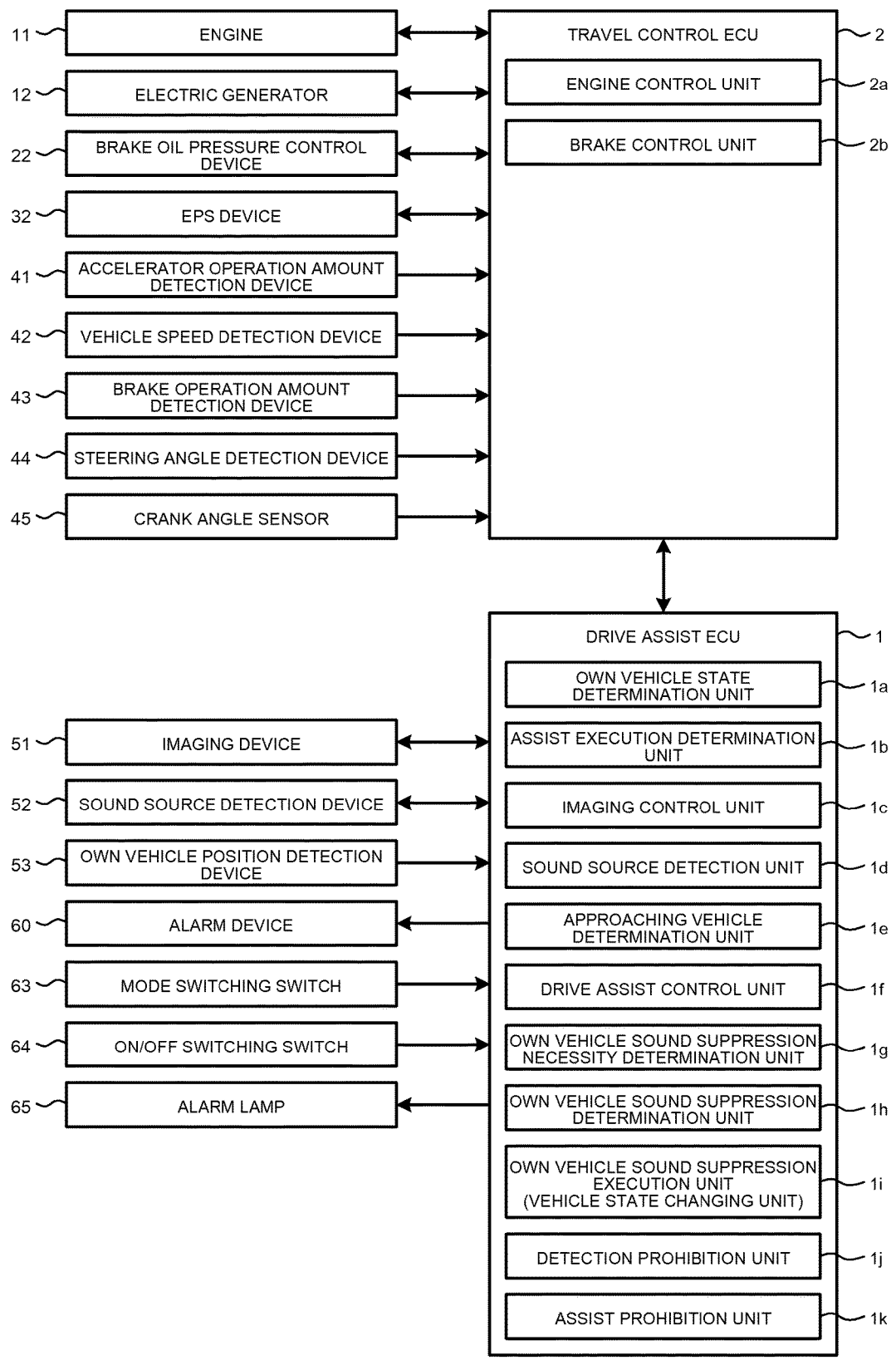
FIG. 5 is a main configuration diagram of the approaching vehicle detection apparatus and the drive assist system according to the invention.

FIG. 5 illustrates a main configuration diagram of the approaching vehicle detection apparatus and the drive assist system.

The travel control ECU 2 includes an engine control unit 2a which controls the engine 11 and a brake control unit 2b which controls the brake oil pressure control device 22.

The drive assist ECU 1 includes an own vehicle state determination unit 1a which determines the vehicle state of the current own vehicle, an assist execution determination unit 1b which determines whether the drive assist may be performed based on the vehicle state, an imaging control unit 1c which controls the imaging device 51, a sound source detection unit 1d which controls the sound source detection device 52, an approaching vehicle determination unit 1e which determines the existence of the approaching vehicle with respect to the own vehicle, and a drive assist control unit 1f which assists the drive of the own vehicle in response to the approaching vehicle when the approaching vehicle exists.

The own vehicle state determination unit 1a may recognize the vehicle speed of the current own vehicle based on, for example, the detection signal of the vehicle speed detection device 42. Further, when the own vehicle sound component may be extracted from the detection signal of the sound source detection device 52, the own vehicle state determination unit 1a may recognize the vehicle state of the current own vehicle based on the own vehicle sound. For example, there is a need to store the waveform of the own vehicle sound component in response to various vehicle states in a storage device or the like. However, it is possible to recognize the travel state and the travel mode of the own vehicle based on the own vehicle sound. Further, it is possible to recognize the rotation number of the engine 11 when the engine 11 is operated.

Further, the own vehicle state determination unit 1a may recognize the current travel mode based on the travel mode information selected by the travel control ECU 2. Further, the own vehicle state determination unit 1a may recognize a state whether the engine 11 is operated or stopped or a state whether the electric generator 12 performs a powering driving operation or a regeneration driving operation based on the instruction information of the travel control ECU 2 with respect to the engine 11 or the electric generator 12. Further, the own vehicle state determination unit 1a may recognize the engine speed based on a detection signal of a crank angle sensor 45. Further, the own vehicle state determination unit 1a may recognize the information on the SOC or the temperature of the secondary battery 13 based on the signal output from the battery monitoring unit 15 or the information acquired by the travel control ECU 2.

The assist execution determination unit 1b determines that the drive assist may be performed when the vehicle speed V of the current own vehicle is equal to or lower than a predetermined vehicle speed V0, and determines that the drive assist may not be performed when the vehicle speed V is higher than the predetermined vehicle speed V0. For example, when the predetermined vehicle speed V0 is set to the slowdown vehicle speed, the assist execution determination unit 1b determines that the drive assist may be performed when the current own vehicle travels slowdown, and determines that the drive assist may not be performed when the current own vehicle travels at a speed higher than the slowdown speed.

The approaching vehicle determination unit 1e determines whether the approaching vehicle exists on the cross road before the own vehicle based on the detection signal of the sound source detection device 52. This determination may be made by the well-known determination method of Field of the invention.

For example, the approaching vehicle determination unit 1e acquires the sound information on the environment around the own vehicle by controlling the sound source detection device 52 in the sound source detection unit 1d. The approaching vehicle determination unit 1e extracts a detection signal of a predetermined frequency bandwidth (a frequency bandwidth with respect to the sound information of the traveling vehicle) from the detection signal of the sound source detection device 52, and compares a power P of the sound information of the predetermined frequency bandwidth with a predetermined threshold value P0. The predetermined threshold value P0 is used to recognize the existence of the sound source (the traveling vehicle), and may be set in advance by, for example, the power of the sound generated from the traveling vehicle in the frequency bandwidth. When the power P of the sound information is equal to or larger than the threshold value P0, it is determined that the sound source (here, the traveling other vehicle) exists. Meanwhile, when the power P is smaller than the threshold value P0, it is determined that the sound source does not exist. The approaching vehicle determination unit 1e makes the determination for each sound source detection device 52. Further, the approaching vehicle determination unit 1e determines the direction or the position of the sound source (the traveling other vehicle) with respect to the own vehicle based on the phase shifting of the sound information of the predetermined frequency bandwidth, and hence determine whether the sound source approaches the own vehicle, that is, the approaching vehicle exists on the cross road.

When it is determined that the approaching vehicle exists on the forward cross road, the drive assist control unit 1f may invite the attention of the driver by displaying the existence of the approaching vehicle on the display unit 61 of the alarm device 60. Further, when it is determined that the approaching vehicle exists in the vicinity of the intersection point of the cross road, the drive assist control unit 1f may further invite the attention of the driver by displaying the existence on the display unit 61 of the alarm device 60. Further, the drive assist control unit 1f may invite the attention of the driver by outputting an alarm sound from the buzzer unit 62.

Further, when the similar approaching vehicle exists, the drive assist control unit 1f may decelerate the own vehicle with a decrease in engine torque or an increase in brake force by transmitting an instruction to the travel control ECU 2 if the vehicle speed V of the own vehicle is equal to or higher than a predetermined vehicle speed. The predetermined vehicle speed is determined by, for example, the vehicle speed, the positional relation, or the like of the own vehicle and the approaching vehicle, and is set to a vehicle speed in which the own vehicle and the approaching vehicle may intersect each other when both vehicles are not decelerated. Further, when the turning angles of the steering wheels Wf1 and Wfr of the own vehicle may not be controlled regardless of the steering operation of the steering wheel 31, the drive assist control unit 1f may separate the own vehicle from the approaching vehicle by controlling the turning angle. Furthermore, the method of separating the own vehicle from the approaching vehicle is not limited thereto. For example, when the braking/driving force applied to each vehicle wheel W may not be individually controlled, the own vehicle may be separated from the approaching vehicle by controlling the braking/driving force.

The drive assist control unit 1f may execute any one of these drive assist modes based on the vehicle state of the current own vehicle such as a vehicle speed and the environment information around the own vehicle acquired by the imaging device 51. That is, at least one of all drive assist modes is performed in the drive assist system.

Figure 6:
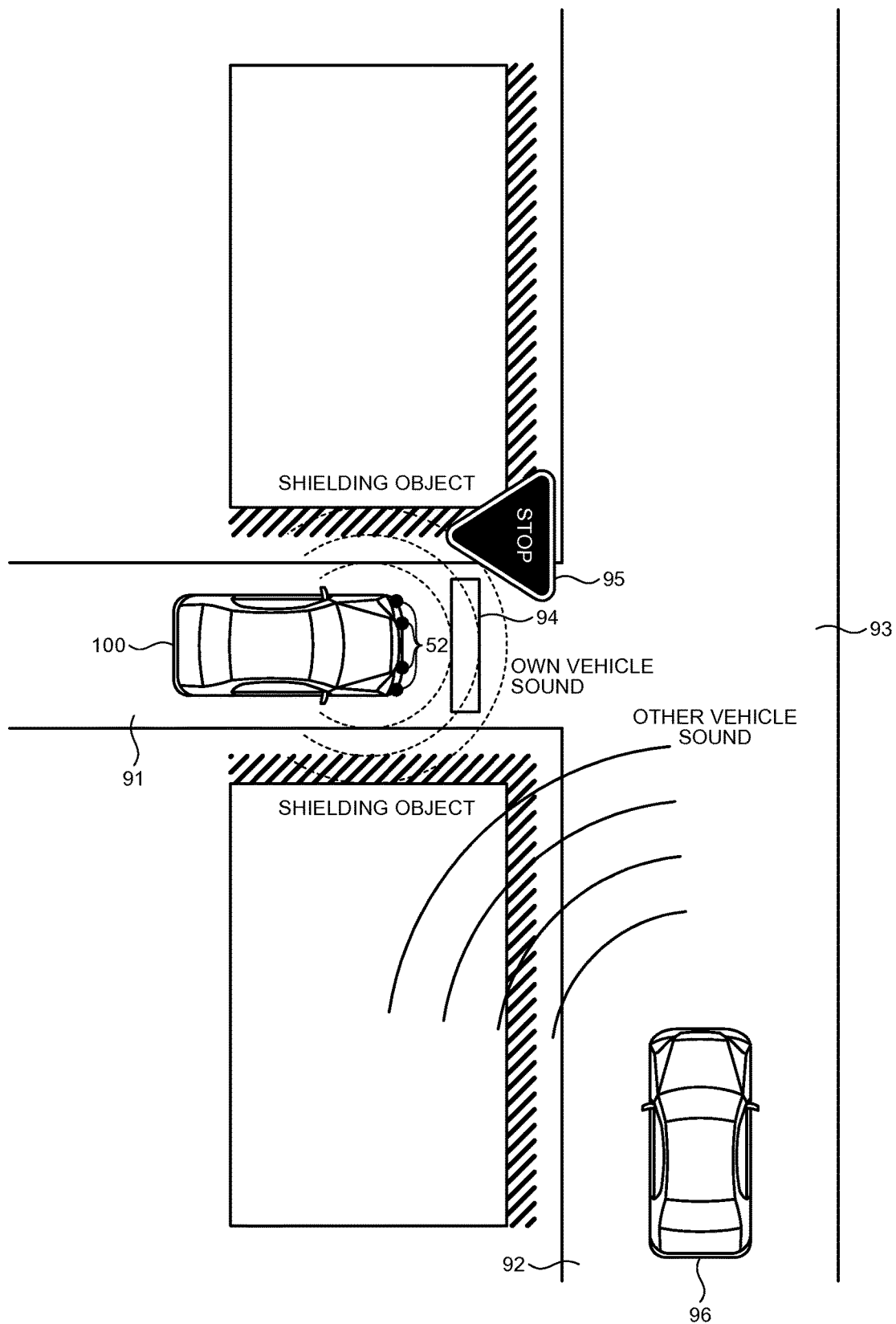
FIG. 6 is a view illustrating one application example of the approaching vehicle detection apparatus and the drive assist system according to the invention.

Incidentally, as illustrated in FIG. 6, the sound source detection device 52 also acquires the own vehicle sound along with the sound information of the environment around the own vehicle (the vehicle 100) such as the other vehicle sound. The own vehicle sound detected by the sound source detection device 52 may be largely classified into a traveling sound and the other sound. As the traveling sound, an engine sound, a cooling fan operation sound, a brake sound (a so-called rattling sound), a road noise generated between the vehicle wheel W and the road surface, a wind sound, or the like may be considered. As the sound other than the traveling sound, an operation sound of a motor or the like used to open or close a window, a wiper operation sound, a sound of a music or the like generated by an audio device inside the vehicle interior, or the like may be considered.

Figure 7:
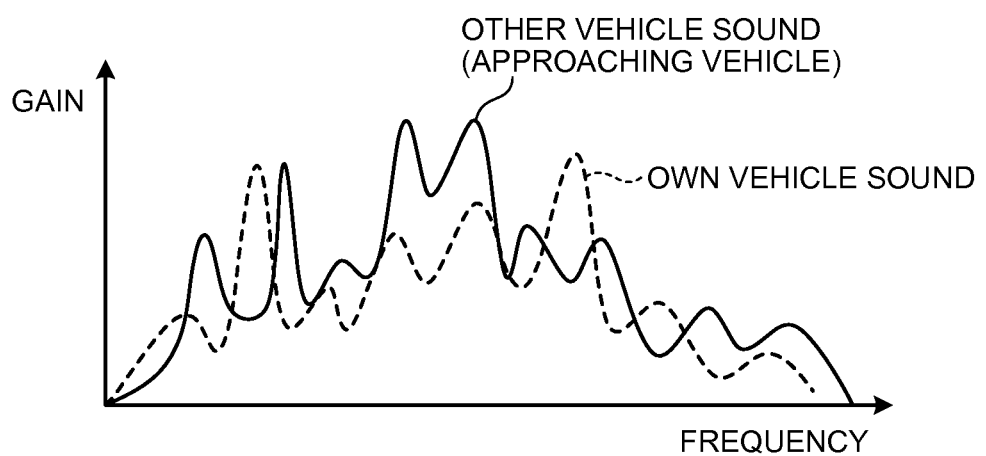
FIG. 7 is a diagram illustrating detected sound information.

FIG. 6 illustrates an example in which the own vehicle enters a cross road 92 as a priority road as a drive assist in an intersection point 93 where a travel road 91 of the own vehicle intersects the cross road 92. The travel road 91 of the own vehicle is provided with a temporary stop line 94 or a mark 95 of a "stop". In this example, an approaching vehicle 96 exists on the cross road 92. In this case, since the own vehicle generates a sound of equal frequency bandwidth as the approaching vehicle 96, the sound information of the predetermined frequency bandwidth includes not only the other vehicle sound, but also the own vehicle sound as illustrated in FIG. 7. Thus, when the own vehicle sound is large, the approaching vehicle determination unit 1e may not easily determine whether the sound source detected based on the sound information is the own vehicle or the other vehicle. Further, even when only the own vehicle exists in the vicinity of the intersection point 93, there is a concern that the sound source detection device 52 may determine that the approaching vehicle 96 exists due to the detected own vehicle sound.

Therefore, when the own vehicle sound is able to be suppressed by the approaching vehicle detection apparatus and the drive assist system, the detection performance of the approaching vehicle 96 is improved by performing the suppression.

Specifically, in the approaching vehicle detection apparatus and the drive assist system, the drive assist ECU 1 includes an own vehicle sound suppression necessity determination unit 1g which determines whether the own vehicle sound needs to be suppressed, an own vehicle sound suppression determination unit 1h which determines whether the own vehicle sound is able to be suppressed, and an own vehicle sound suppression execution unit 1i which suppresses the own vehicle sound.

The own vehicle sound suppression necessity determination unit 1g determines whether the own vehicle sound needs to be suppressed based on the vehicle state of the current own vehicle. For example, when the vehicle state of the current own vehicle is the engine stop state or the EV travel state, the own vehicle sound as a noise becomes smaller than the other vehicle sound compared to the engine operation state, and hence the S/N ratio with respect to the sound information of the predetermined frequency bandwidth increases. Therefore, when the vehicle state of the current own vehicle is the engine stop state or the EV travel state, the own vehicle sound suppression necessity determination unit 1g determines that the own vehicle sound does not need to be suppressed. Meanwhile, when the vehicle state of the current own vehicle is the engine operation state, the own vehicle sound becomes equal to the other vehicle sound or a difference between the own vehicle sound and the other vehicle sound relatively decreases compared to the case of the engine stop state or the EV travel state, and hence the S/N ratio with respect to the sound information of the predetermined frequency bandwidth decreases. Therefore, the own vehicle sound suppression necessity determination unit 1g determines that the own vehicle sound needs to be suppressed in the engine operation state.

Further, the own vehicle sound suppression necessity determination unit 1g may determine whether the own vehicle sound needs to be suppressed by obtaining the S/N ratio with respect to the detection signal of the sound information of the predetermined frequency bandwidth and comparing the S/N ratio with a predetermined value. The predetermined value may be set as the S/N ratio of the detection signal of the sound information of a predetermined frequency bandwidth detected, for example, when the influence of the noise (the own vehicle sound) with respect to the detection signal (the other vehicle sound) is small, that is, the own vehicle sound decreases due to the stop of the engine or the like. The own vehicle sound suppression necessity determination unit 1g determines that the own vehicle sound needs to be suppressed when the S/N ratio is equal to or smaller than a predetermined value (for example, 40%), and determines that the own vehicle sound does not need to be suppressed when the S/N ratio is larger than the predetermined value.

When it is determined that the own vehicle sound needs to be suppressed, the own vehicle sound suppression determination unit 1h determines whether the suppression may be performed.

For example, the own vehicle sound suppression determination unit 1h determines whether the own vehicle sound is able to be suppressed by determining the attribute (such as during the operation of the engine) and the magnitude of the own vehicle sound when the own vehicle sound may be extracted from the sound information of the predetermined frequency bandwidth. At that time, for example, the attribute and the magnitude of the extracted own vehicle sound may be determined by using the waveform or the like of the own vehicle sound component in response to various vehicle states in the above-described storage device.

Further, for example, the own vehicle sound suppression determination unit 1h determines whether the own vehicle sound is able to be suppressed by changing the vehicle state of the own vehicle from the current state. Specifically, when the vehicle state of the current own vehicle is the engine mode or the hybrid mode, it is determined whether the vehicle state of the own vehicle may be changed to the EV travel state. Further, when the vehicle state of the current own vehicle is in the engine operation state, it is determined whether the vehicle state of the own vehicle may be changed to the engine stop state.

For example, the determination on whether the EV travel state may be changed to is made by using an EV travel permission condition when the travel control ECU 2 performs the EV travel in a normal state (here, a state where the drive assist is not performed) and an EV travel prohibition condition when the travel control ECU 2 prohibits the EV travel in a normal state. As the EV travel permission condition (the EV travel prohibition condition), various vehicle states of the own vehicle such as the system temperature of the hybrid system 10 (the temperature of the secondary battery 13 or the like), the SOC value of the secondary battery 13, the state of the engine 11, the vehicle speed, the operation amount of the accelerator pedal 15, and the state of the cruise control system may be considered.

When the system temperature is a temperature within a predetermined range (a temperature when the operation of the hybrid system 10 is stabilized), the EV travel permission condition is corresponded. Meanwhile, when the system temperature is higher or lower than the predetermined range, the EV travel prohibition condition is corresponded. Further, when the SOC value of the secondary battery 13 is larger than a predetermined value (the SOC value which requires the charging of the secondary battery 13, that is, the SOC value which prohibits the discharging), the EV travel permission condition is corresponded. Meanwhile, when the SOC value is equal to or smaller than the predetermined value, the EV travel prohibition condition is corresponded. Further, when the warming-up operation of the engine 11 is performed, the EV travel prohibition condition is corresponded in order to first ensure the early emission performance with the warming-up operation. Meanwhile, the warming-up operation of the engine 11 is not performed, the EV travel permission condition is corresponded. Further, when the vehicle speed of the own vehicle is included in a predetermined EV travel vehicle speed range (the vehicle speed in which the EV travel set for each vehicle may be performed), the EV travel permission condition is corresponded. Meanwhile, when the vehicle speed is not included in the predetermined EV travel vehicle speed range, the EV travel prohibition condition is corresponded. Further, when the operation amount of the accelerator pedal 15 is equal to smaller than a predetermined amount, the requested driving force is small, and hence the EV travel permission condition is corresponded. Meanwhile, when the operation amount is larger than the predetermined amount, the requested driving force is large, and hence the EV travel prohibition condition is corresponded. Further, when the cruise control system is operated, the EV travel prohibition condition is corresponded. Meanwhile, when the cruise control system is not operated, the EV travel permission condition is corresponded.

When the EV travel permission condition is corresponded, the own vehicle sound suppression determination unit 1h determines that the EV travel is able to be performed and the own vehicle sound is able to be suppressed by the change of the vehicle state of the own vehicle. Meanwhile, when the EV travel prohibition condition is corresponded, the own vehicle sound suppression determination unit 1h determines that the EV travel is not able to be performed and the own vehicle sound is not able to be suppressed by the change of the vehicle state of the own vehicle. In this example, when the system temperature and the like are all correspond to the EV travel permission condition, it is determined that the EV travel is able to be performed. Then, when any one of them corresponds to the EV travel prohibition condition, it is determined that the EV travel is not able to be performed.

It is determined whether the engine stop state may be changed to, for example, based on the vehicle state of the own vehicle. The determination on whether the engine stop state may be changed to is made in the case where a shift lever in the vehicle interior is operated to a D (drive) range, a N (neutral) range, or a P (park) range, the case where the temperature of the engine cooling water becomes a temperature within a predetermined range (a temperature when the engine 11 is stabilized after the warming-up operation), the case where the vehicle speed of the own vehicle becomes equal to or lower than a predetermined vehicle speed (for example, a low vehicle speed), the case where the engine speed becomes equal to or smaller than a predetermined rotation number (that is, the case where the engine 11 is not maintained in a high-load drive state), the case where the voltage of the secondary battery 13 becomes equal to or smaller than a predetermined value, the case where the temperature of the secondary battery 13 becomes equal to or smaller than a predetermined temperature, and the case where the road surface gradient of the travel road 91 of the own vehicle becomes equal to or smaller than a predetermined gradient (a gradient in which the own vehicle does not move backward due to the stop of the engine).

When it is determined that the own vehicle sound is able to be suppressed, the own vehicle sound suppression execution unit 1i suppresses the own vehicle sound. The own vehicle sound suppression execution unit 1i suppresses the own vehicle sound by decreasing a sound generated from the own vehicle with the change of the vehicle state of the own vehicle. That is, the own vehicle sound suppression execution unit 1i mentioned herein may be referred to as the vehicle state changing unit that changes the vehicle state of the own vehicle to the vehicle state where the own vehicle sound is able to be suppressed when the own vehicle sound generated from the own vehicle is able to be suppressed by the change of the vehicle state of the own vehicle. For example, when it is determined that the own vehicle sound suppression determination unit 1h may be changed to the EV travel state, the own vehicle sound suppression execution unit 1*i* suppresses the own vehicle sound by changing the vehicle state of the own vehicle to the EV travel state regardless of the state whether the own vehicle travels (also including a deceleration state) or stops. Further, when it is determined that the own vehicle sound suppression determination unit 1*h* may stop the engine 11, the own vehicle sound suppression execution unit 1*i* suppresses the own vehicle sound by changing the vehicle state of the own vehicle to the engine stop state regardless of the state whether the own vehicle travels (also including a deceleration state) or stops.

Figure 8:
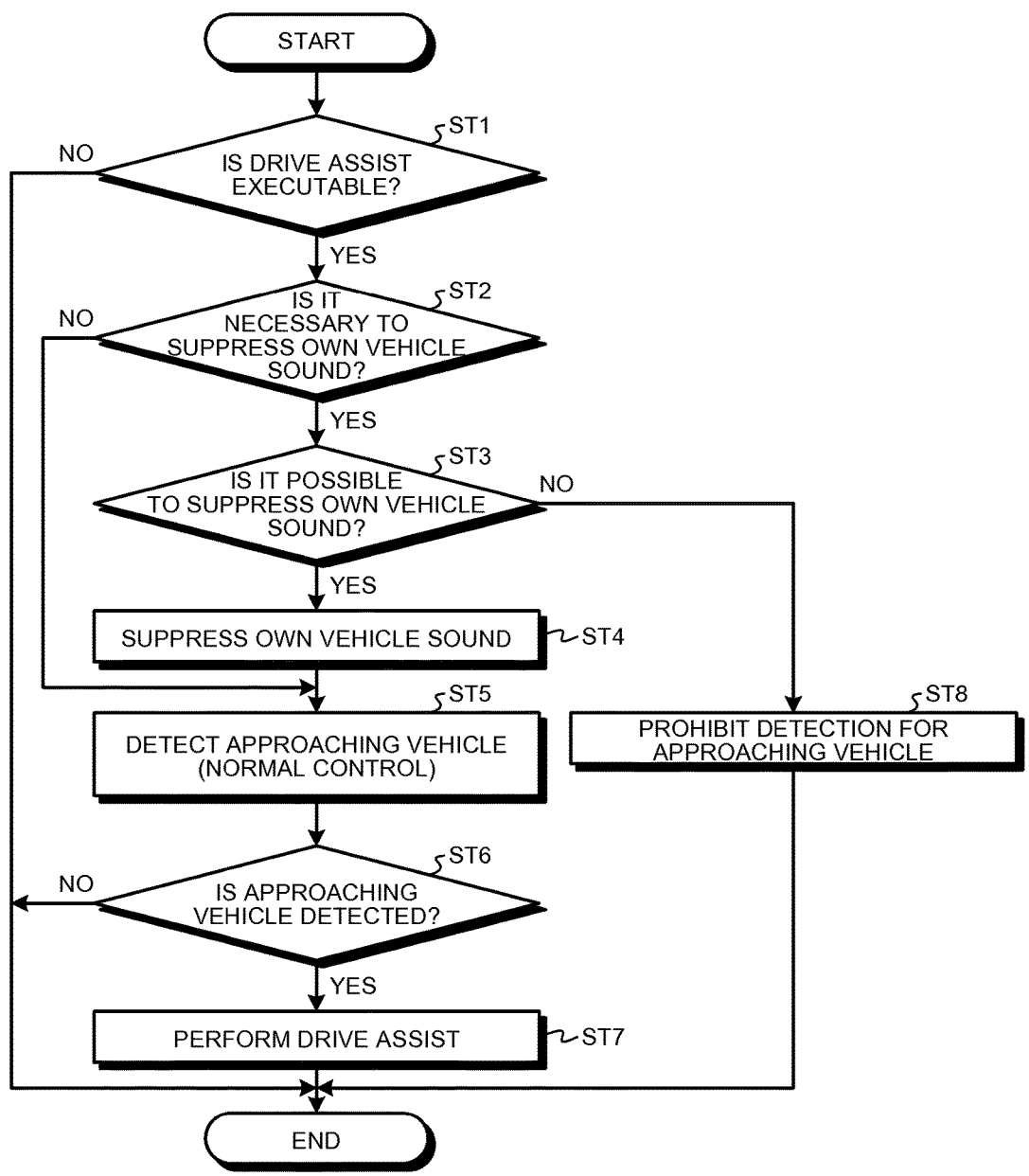
FIG. 8 is a flowchart illustrating a calculation process of the example.

Hereinafter, the determination on the state whether the sound source is the target approaching vehicle and the drive assist based on the determination will be described based on the flowchart of FIG. 8. In the example of FIG. 8, the own vehicle sound is suppressed as soon as the control for detecting the approaching vehicle 96 starts or before the detection control starts. The calculation process is repeated from the first step after the determination for the end when the mode switching switch 63 is the automatic mode or the on/off switching switch 64 is turned on.

First, the assist execution determination unit 1*b* determines whether the drive assist may be performed based on the vehicle state of the current own vehicle (step ST1). For example, in this example, it is determined whether the drive assist may be performed by determining whether the vehicle speed V of the current own vehicle becomes equal to or lower than the predetermined vehicle speed V0. When the vehicle speed V is higher than the predetermined vehicle speed V0, the assist execution determination unit 1*b* determines that the drive assist may not be performed and makes an end determination. Meanwhile, when the vehicle speed V becomes equal to or smaller than the predetermined vehicle speed V0, the assist execution determination unit 1*b* determines that the drive assist may be performed.

When it is determined that the vehicle state of the current own vehicle is a state where the drive assist may not be performed, the own vehicle sound suppression necessity determination unit 1*g* determines whether the own vehicle sound needs to be suppressed when the approaching vehicle 96 is detected (step ST2).

Here, as described above, this determination is made based on the vehicle state of the current own vehicle. That is, when the vehicle state of the current own vehicle is, for example, the engine operation state, there is a high possibility that the own vehicle sound increases. For this reason, the own vehicle sound suppression necessity determination unit 1*g* determines that the own vehicle sound needs to be suppressed. Meanwhile, when the vehicle state of the current own vehicle is, for example, the engine stop state or The EV travel state, the own vehicle sound becomes smaller than the other vehicle sound, and hence the own vehicle sound suppression necessity determination unit determines that the own vehicle sound does not need to be suppressed. When the own vehicle sound does not need to be suppressed, the determination for the approaching vehicle 96 may be made based on the sound information detected by the sound source detection device 52 similarly to the normal control of the related art, and hence the routine proceeds to step ST5 to be described below.

Further, as described above, the own vehicle sound suppression necessity determination unit 1*g* may determine whether the own vehicle sound needs to be suppressed by obtaining the S/N ratio with respect to the detection signal of the sound information of the predetermined frequency bandwidth and comparing the S/N ratio with a predetermined value. When the S/N ratio is equal to or smaller than a predetermined value, there is a possibility that the own vehicle sound may increase, and hence the own vehicle sound suppression necessity determination unit 1*g* determines that the own vehicle sound needs to be suppressed. Meanwhile, when the S/N ratio is larger than the predetermined value, the own vehicle sound is small, and hence the own vehicle sound suppression necessity determination unit 1*g* determines that the own vehicle sound does not need to be suppressed.

When it is determined that the own vehicle sound needs to be suppressed, the own vehicle sound suppression determination unit 1*h* determines whether the own vehicle sound is able to be suppressed (step ST3).

In step ST3, it is determined whether the own vehicle sound is able to be suppressed by determining whether the vehicle state of the own vehicle may be changed to the EV travel state or the engine stop state. When it is determined that the EV travel state may be changed to, the own vehicle sound suppression determination unit 1*h* determines that the own vehicle sound is able to be suppressed by the selection of the EV travel state. Further, when it is determined that the engine stop state may be changed to, the own vehicle sound suppression determination unit 1*h* determines that the own vehicle sound is able to be suppressed by stopping the engine 11. Meanwhile, when the EV travel state or the engine stop state may not be changed to, the own vehicle sound suppression determination unit 1*h* determines that the own vehicle sound is not able to be suppressed.

Further, in step ST3, it may be determined whether the vehicle state of the own vehicle may be changed to the EV travel state or the engine stop state. For example, when it is determined that the EV travel state or the engine stop state may be changed to, for example, the current travel mode is the engine mode or the hybrid mode, the own vehicle sound suppression determination unit 1*h* determines that the own vehicle sound is able to be suppressed by changing to the EV travel mode or stopping the engine 11 in the engine mode or the hybrid mode. Further, when it is determined that the engine stop state may be changed to, but the EV travel state may not be changed to, the own vehicle sound suppression determination unit 1*h* determines that the own vehicle sound is able to be suppressed by stopping the engine 11. Meanwhile, when it is determined that the EV travel state may be changed to, but the engine stop state may not be changed to, the engine 11 is not able to be stopped, and hence the own vehicle sound suppression determination unit 1*h* determines that the own vehicle sound is not able to be suppressed.

When it is determined that the own vehicle sound is able to be suppressed, the own vehicle sound suppression execution unit 1*i* suppresses the own vehicle sound (step ST4). When it is determined that the own vehicle sound is able to be suppressed by changing to the EV travel state, the own vehicle sound suppression execution unit 1*i* suppresses the own vehicle sound by switching the travel mode to the EV mode so as to change the vehicle state of the own vehicle to the EV travel state. Further, when it is determined that the own vehicle sound is able to be suppressed by changing to the engine stop state, the own vehicle sound suppression execution unit 1*i* suppresses the own vehicle sound by stopping the engine 11. Further, when it is determined that the own vehicle sound is able to be suppressed by changing to the EV travel mode or stopping the engine 11 in the current engine mode or the hybrid mode, the own vehicle sound suppression execution unit 1*i* changes to the EV travel mode or stops the engine so as to suppress the own vehicle sound. At that time, for example, when the SOC of the secondary battery 13 is close to the full charging state, the vehicle state may be selected in response to the vehicle state of the current own vehicle by the selection of the EV travel mode.

After it is determined that the own vehicle sound does not need to be suppressed in step ST2 or the own vehicle sound is suppressed in step ST4, the approaching vehicle determination unit 1e performs the control for detecting the approaching vehicle 96 (step ST5). Hereinafter, the detection control performed herein is performed in the normal control state. The control for detecting the approaching vehicle 96 will be described based on the flowchart of FIG. 9. Furthermore, the normal control mentioned herein is a control that does not change the detection level for the approaching vehicle 96 in a third modified example to be described later.

The approaching vehicle determination unit 1e acquires information necessary for the control for detecting the approaching vehicle 96 (step ST5A). Here, the sound information or the own vehicle position information detected by each sound source detection device 52 is acquired. This necessary information is stored in, for example, a temporary storage device of the drive assist ECU 1. Furthermore, when there is no need to suppress the own vehicle sound and the necessary information is acquired already in the precedent step (step ST1 to step ST4), the approaching vehicle determination unit 1e may omit the process in step ST5A and may acquire the necessary information again.

Figure 10:
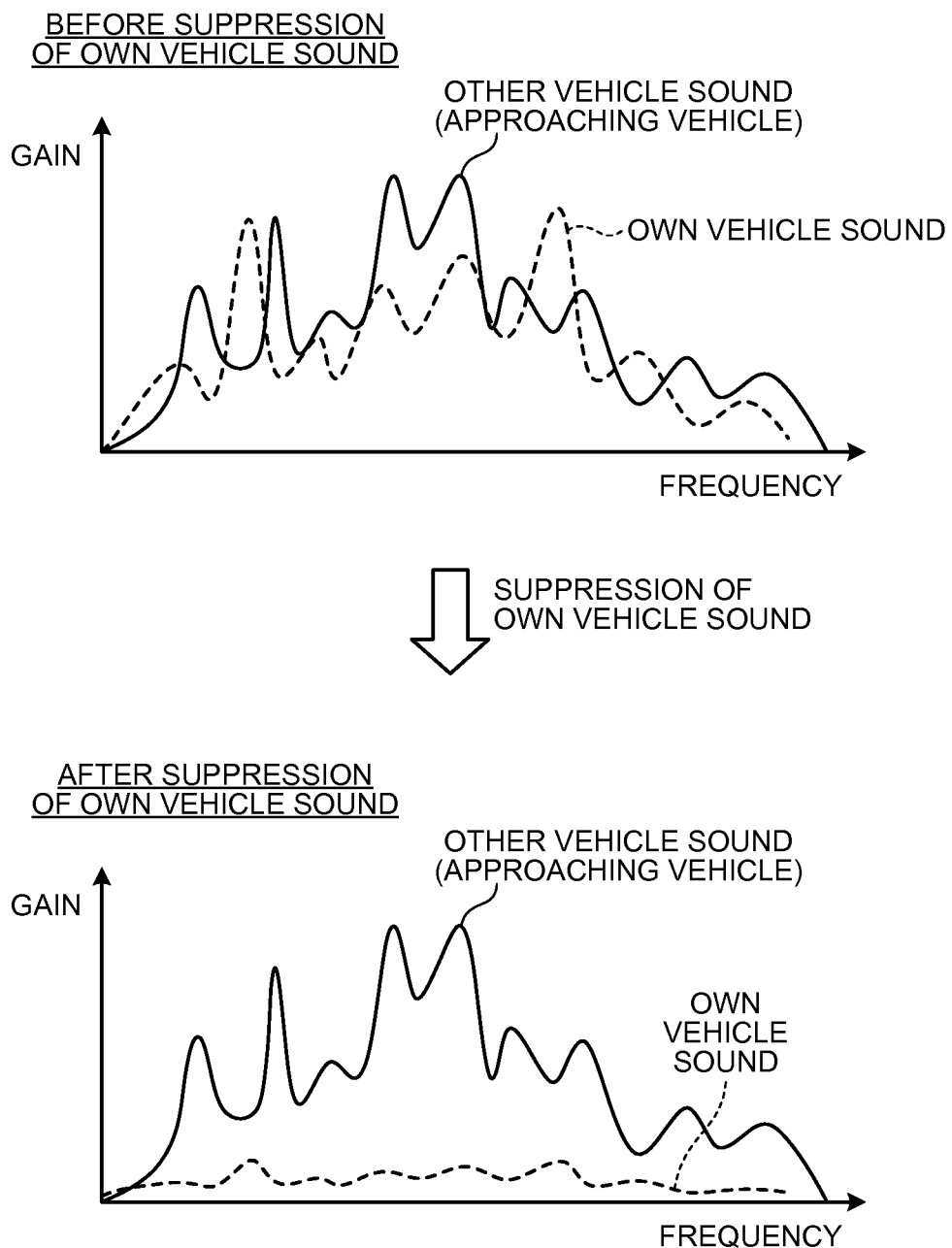
FIG. 10 is a diagram illustrating sound information before and after own vehicle sound is suppressed.

When the own vehicle sound is suppressed, the sound information of the predetermined frequency bandwidth acquired in step ST5A indicates that the own vehicle sound becomes smaller than the other vehicle sound as illustrated in the lower drawing of FIG. 10.

The approaching vehicle determination unit 1e extracts the detection signal of the predetermined frequency bandwidth from the detection signal of the sound source detection device 52 and calculates the power P of the sound information of the predetermined frequency bandwidth (step ST5B). For example, the power P is obtained by dividing the predetermined frequency bandwidth into a plurality of parts and calculating an average value of the power values of the sound information. At that time, the approaching vehicle determination unit 1e may remove a high-frequency noise component from the sound information of the predetermined frequency bandwidth by, for example, a low-pass filter and obtaining the power P of the sound information of the predetermined frequency bandwidth subjected to the removal of the noise.

The approaching vehicle determination unit 1e compares the power P with the above-described predetermined threshold value P0 (step ST5C). When the power P is equal to or larger than the threshold value P0, the approaching vehicle determination unit 1e determines that the sound source (the traveling other vehicle) exists. Meanwhile, when the power P is smaller than the threshold value P0, the approaching vehicle determination unit determines that the sound source (that is, the approaching vehicle 96) does not exist, and makes an end determination that the approaching vehicle detection control ends. This determination is made for each sound source detection device 52.

When the power P is equal to or larger than the threshold value P0, the approaching vehicle determination unit 1e obtains the orientation angle of the sound source with respect to the own vehicle based on the sound information detected by at least two sound source detection devices 52 involving with the sound source (the traveling other vehicle) (step ST5D). Here, the phase shifting of the sound information detected by each sound source detection device 52 is obtained, and the orientation angle of the sound source (the traveling other vehicle) with respect to the own vehicle is obtained based on the phase shifting.

The approaching vehicle determination unit 1e determines whether the sound source movement direction may be determined (step ST5E). When the calculation of step ST5D is performed twice or more, a determination may be made in which the sound source moves when a shifting occurs in the orientation angle of the sound source of each calculation result. On the contrary, when the calculation of step ST5D is performed only once, it is difficult to determine whether the sound source moves. Therefore, when the calculation of step ST5D is performed twice or more in step ST5E, it is determined that the sound source movement direction may be determined. Meanwhile, when the calculation of step ST5D is performed only once, it is determined that the sound source movement direction may not be determined, and hence the routine returns to, for example, step ST5A.

When the sound source movement direction may not be determined, the approaching vehicle determination unit 1e determines whether the sound source is close to the intersection point 93 by comparing the orientation angles of the sound source corresponding to at least two periods (step ST5F). That is, in this example, it is determined whether the sound source is the approaching vehicle 96. Here, when the shifting of the orientation angles of the sound source indicates a state where the sound source is close to the intersection point 93, it is determined that the sound source is close to the intersection point 93. Meanwhile, when the shifting of the orientation angles of the sound source indicates a state where the sound source is away from the intersection point 93 or the sound source stops without the shifting of the orientation angles of the sound source in step ST5F, it is determined that the sound source is not close to the intersection point 93. When the sound source is not close to the intersection point 93, the approaching vehicle determination unit 1e determines that the approaching vehicle 96 is not detected and makes an end determination that the approaching vehicle detection control ends.

When it is determined that the sound source (the traveling other vehicle) is close to the intersection point 93, the approaching vehicle determination unit 1e determines that the approaching vehicle 96 with respect to the own vehicle is detected in the intersection point 93 (step ST5G).

The drive assist control unit 1f determines whether the approaching vehicle 96 with respect to the own vehicle is detected (step ST6). When the approaching vehicle 96 is not detected, the drive assist control unit 1f makes an end determination that the drive assist control ends. Meanwhile, when the approaching vehicle 96 is detected, the drive assist control unit 1f performs, for example, the above-described drive assist based on the approaching vehicle 96 (step ST7).

Here, when it is determined that the own vehicle sound is not able to be suppressed in step ST3, the approaching vehicle detection apparatus and the drive assist system prohibit the control for detecting the approaching vehicle 96 (step ST8), and makes an end determination that the drive assist control ends. At that time, when the control for detecting the approaching vehicle 96 is performed in the precedent calculation period, the control for detecting the approaching vehicle 96 in execution is stopped. The process in step ST8 is performed by a detection prohibition unit 1j of the drive assist ECU 1. When the own vehicle sound is not able to be suppressed, the detection prohibition unit 1j may prohibit the detection for the sound source by the sound source detection device 52.

In this way, when the current vehicle state is a state where the own vehicle sound needs to be suppressed and the current vehicle state is a state where the own vehicle sound is able to be suppressed, the approaching vehicle detection apparatus and the drive assist system of the example actually suppresses the own vehicle sound by stopping the engine 11 or changing to the EV travel. Thus, since the approaching vehicle detection apparatus or the like may determine whether the approaching vehicle 96 exists based on the sound information in which the own vehicle sound is suppressed from the detection signal, the determination precision for the approaching vehicle 96 is improved. Then, the drive assist system may perform a highly precise drive assist in response to the existence of the approaching vehicle 96 with high determination precision. Meanwhile, when the current vehicle state is a state where the own vehicle sound is not able to be suppressed regardless of a state where the own vehicle sound needs to be suppressed, the approaching vehicle detection apparatus and the drive assist system do not perform the control for detecting the approaching vehicle 96 or the detection for the sound source. Therefore, here, the information of the approaching vehicle 96 is not provided, and hence the drive assist control is also substantially prohibited. That is, the drive assist system does not perform the drive assist based on the information in which the reliability for determining the approaching vehicle 96 is common. Thus, the approaching vehicle detection apparatus and the drive assist system may solve a trouble of the driver caused by such a drive assist. As described above, since the approaching vehicle detection apparatus and the drive assist system of the example may obtain the determination result of the approaching vehicle 96 with high precision, there is a benefit that the drive assist suitable for the approaching vehicle 96 may be performed. Furthermore, when the sound source for the approaching vehicle 96 is not detected, the approaching vehicle detection apparatus and the drive assist system of the example may notify a state where the sound source of the approaching vehicle 96 is not detected to the driver.

In the approaching vehicle detection apparatus and the drive assist system, when the vehicle state enters a drive state where the own vehicle sound of the own vehicle is able to be suppressed after the control for detecting the approaching vehicle 96 or the detection for the sound source is prohibited, a highly precise drive assist is switched due to the suppression of the own vehicle sound.

[First Modified Example]

Figure 11:
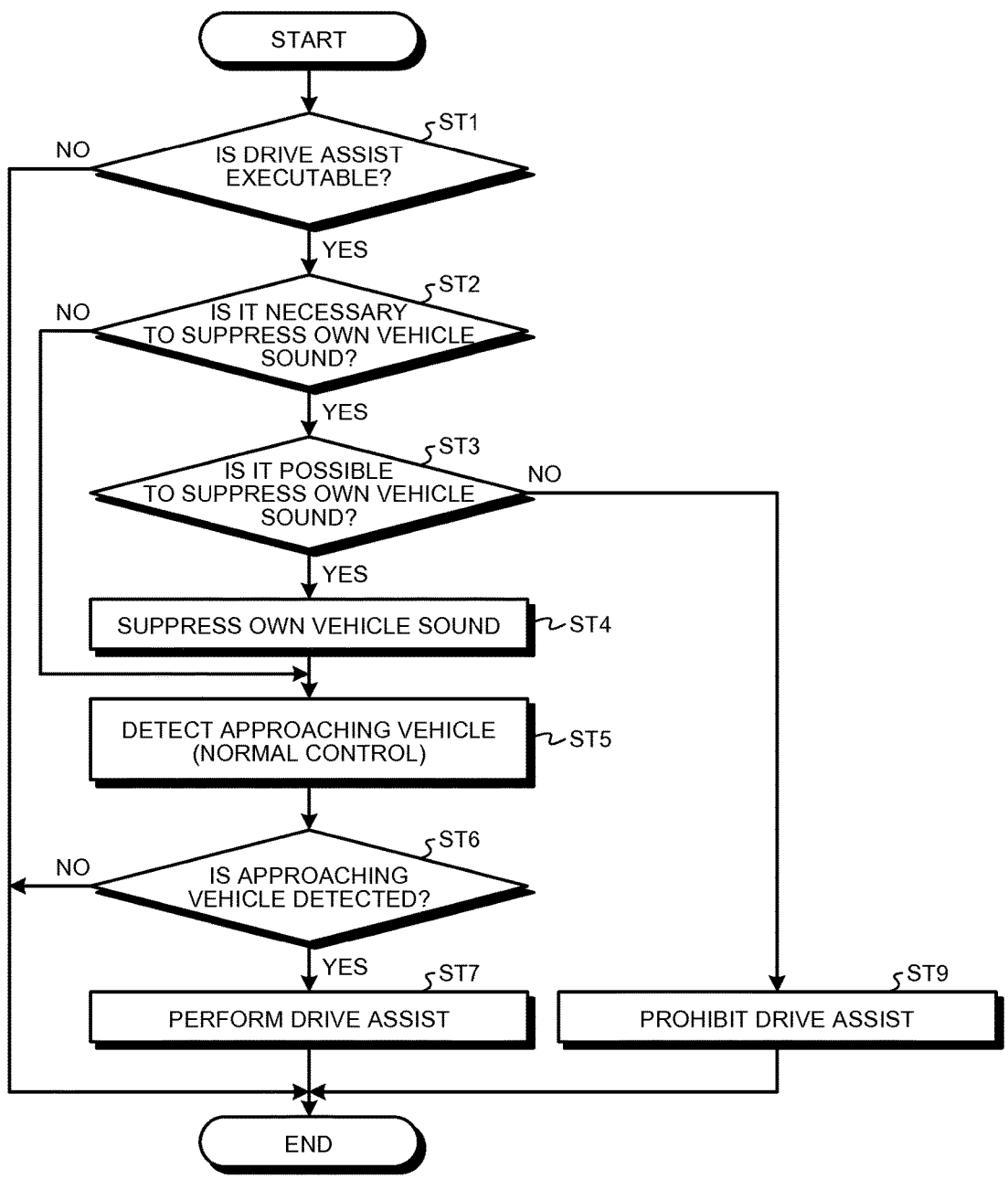
FIG. 11 is a flowchart illustrating a calculation process of a first modified example.

In the above-described example, the control for detecting the approaching vehicle 96 is prohibited when the own vehicle sound is not able to be suppressed. On the contrary, when it is determined that the own vehicle sound is not able to be suppressed in step ST3 as illustrated in the flowchart of FIG. 11, the drive assist system of the modified example prohibits the drive assist control (step ST9), and makes an end determination that the drive assist control ends. This is because the reliability for the detection result of the approaching vehicle 96 is common even when the approaching vehicle 96 is detected and the driver may feel troublesome. Therefore, the drive assist control in execution is stopped when the drive assist control is performed in the precedent calculation period.

Here, the prohibition of the drive assist control is performed by an assist prohibition unit 1k of the drive assist ECU 1. When the own vehicle sound is not able to be suppressed, the assist prohibition unit 1k may prohibit any one of the detection for the sound source, the control for detecting the approaching vehicle 96, and the drive assist control. Accordingly, when the detection for the sound source or the control for detecting the approaching vehicle 96 is prohibited, the control for detecting the approaching vehicle 96 and the drive assist control are both prohibited. Meanwhile, when the drive assist control is prohibited, only the drive assist control is prohibited.

Even in this configuration, since the own vehicle sound is actually suppressed when the current vehicle state is a state where the own vehicle sound needs to be suppressed and the current vehicle state is a state where the own vehicle sound is able to be suppressed, the approaching vehicle detection apparatus and the drive assist system of the modified example may have high determination precision for the approaching vehicle 96, and may perform a highly precise drive assist in response to the existence of the approaching vehicle 96 with high determination precision. Meanwhile, since the approaching vehicle detection apparatus and the drive assist system do not perform the drive assist based on the detection result of the approaching vehicle 96 in which the reliability is common, it is possible to solve the trouble of the driver caused by such a drive assist.

In the approaching vehicle detection apparatus and the drive assist system, when the current vehicle state becomes an operation state where the own vehicle sound of the own vehicle is able to be suppressed after the drive assist control or the like is prohibited, a highly precise drive assist is switched due to the suppression of the own vehicle sound.

Furthermore, the approaching vehicle detection apparatus and the drive assist system of the modified example may permit or prohibit the control for detecting the approaching vehicle 96.

[Second Modified Example]

When the own vehicle sound is not able to be suppressed, the approaching vehicle detection apparatus and the drive assist system of the above-described example or the first modified example prohibits the control for detecting the approaching vehicle 96 or the drive assist control. However, even in this case, when the own vehicle enters the intersection point 93, there is a case in which the approaching vehicle 96 exists near the intersection point 93 or within the intersection point 93. Therefore, the approaching vehicle detection apparatus and the drive assist system of the modified example are configured to perform a drive assist in which the own vehicle sound is not able to be suppressed even when the own vehicle sound is not able to be suppressed.

Specifically, when the own vehicle sound is not able to be suppressed, the approaching vehicle detection apparatus and the drive assist system of the modified example removes the noise corresponding to the own vehicle sound and then performs the control for detecting the approaching vehicle 96. The noise corresponding to the own vehicle sound is stored in advance in the drive assist ECU 1 or the like by setting the measured own vehicle sound (the engine sound or the like of the own vehicle) as a noise model.

Therefore, in the approaching vehicle detection apparatus and the drive assist system of the modified example, for example, a noise removal process unit (not illustrated) that performs a noise removal process is provided in the drive assist ECU 1. For example, the noise removal process is performed on the sound information detected by the sound source detection device 52. In this case, the sound source detection unit 1d detects the sound source around the own vehicle based on the sound information subjected to the noise removal process, and the approaching vehicle determination unit 1e determines whether the sound source is the approaching vehicle 96 with respect to the own vehicle.

Further, the noise removal process may be performed on the sound information involving with the sound source detected by the sound source detection unit 1d. In this case, the approaching vehicle determination unit 1e determines whether the sound source subjected to the noise removal process is the approaching vehicle 96 with respect to the own vehicle. That is, the noise removal process unit performs the noise removal process on the sound information involving with the sound source detected by the sound source detection unit 1d or the sound information detected by the sound source detection device 52 when the own vehicle sound generated from the own vehicle is not able to be suppressed, and does not perform the noise removal process on the sound information when the own vehicle sound generated from the own vehicle is able to be suppressed.

Since the approaching vehicle detection apparatus and the drive assist system of the modified example perform the noise removal process, it is possible to obtain the same sound information of the sound source as the case where the own vehicle sound is able to be suppressed actually even when the own vehicle sound generated from the own vehicle is not able to be suppressed, and hence to perform the highly precise determination for the approaching vehicle 96 and a highly precise drive assist.

Figure 12:
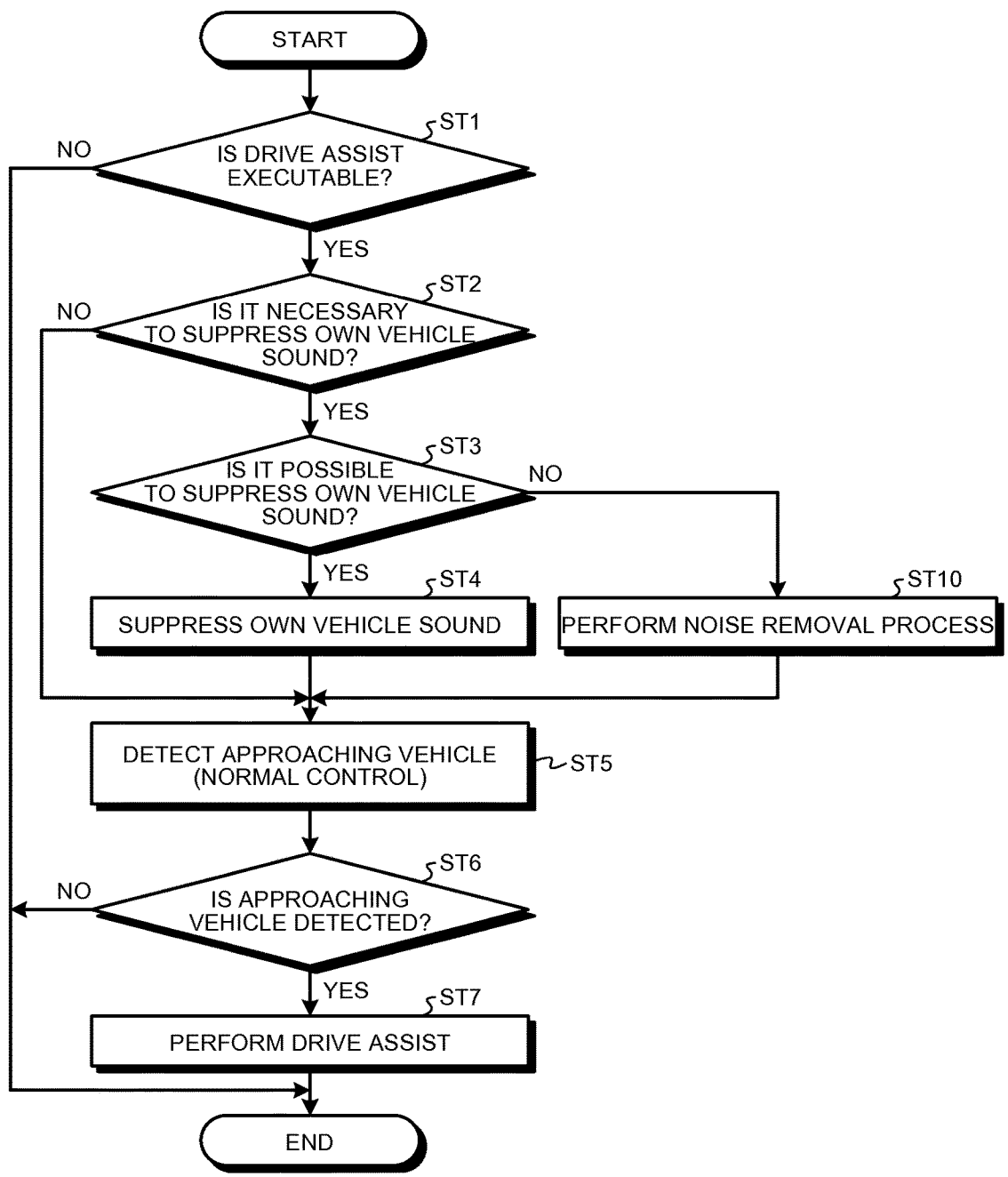
FIG. 12 is a flowchart illustrating a calculation process of a second modified example.

Here, an example of the calculation process of the approaching vehicle detection apparatus and the drive assist system of the modified example will be described based on the flowchart of FIG. 12. Here, a case is exemplified in which the noise removal process is performed on the sound information detected by the sound source detection device 52. Furthermore, since the calculation process in the case where the own vehicle sound is able to be suppressed is the same as that of the above-described example or the first modified example, the description thereof will be omitted herein.

When it is determined that the own vehicle sound is not able to be suppressed in step ST3, the approaching vehicle detection apparatus and the drive assist system perform the noise removal process on the sound information detected by the sound source detection device 52 (step ST10). As described above, since the noise (the noise model of the own vehicle sound) corresponding to the own vehicle sound is removed, the sound information subjected to the noise removal process becomes equal sound information as the case where the own vehicle sound is actually suppressed. Subsequently, the approaching vehicle detection apparatus and the drive assist system perform the control for detecting the approaching vehicle 96 by causing the routine to proceed to step ST5, and hence may detect the approaching vehicle 96 with high precision.

In this way, since the approaching vehicle detection apparatus and the drive assist system of the modified example actually suppress the own vehicle sound when the current vehicle state is a vehicle state where the own vehicle sound needs to be suppressed and the current vehicle state is a vehicle state where the own vehicle sound is able to be suppressed, the determination precision for the approaching vehicle 96 is high, and hence it is possible to perform a highly precise drive assist in response to the existence of the approaching vehicle 96 with high determination precision. Meanwhile, even when the own vehicle sound may not be actually suppressed, the determination precision for the approaching vehicle 96 is improved in the same degree as the case where the own vehicle sound is actually suppressed, and hence the approaching vehicle detection apparatus and the drive assist system may perform a highly precise drive assist in response to the existence of the approaching vehicle 96 with high determination precision.

In the approaching vehicle detection apparatus and the drive assist system, when the vehicle state becomes a drive state where the own vehicle sound of the own vehicle is able to be suppressed after the determination for the approaching vehicle is made with the noise removal process, a highly precise drive assist may be switched due to the suppression of the own vehicle sound.

[Third Modified Example]

The approaching vehicle detection apparatus and the drive assist system of the modified example are configured to perform a drive assist in which the own vehicle sound is not able to be suppressed even when the own vehicle sound is not able to be suppressed similarly to the approaching vehicle detection apparatus and the drive assist system of the above-described second modified example.

Specifically, in the approaching vehicle detection apparatus and the drive assist system of the modified example, the control for detecting the approaching vehicle 96 is performed similarly to the normal control of step ST5 even when the own vehicle sound is not able to be suppressed. Here, when there is a possibility that the approaching vehicle 96 may exist when the approaching vehicle 96 is detected, there is also a possibility that the approaching vehicle 96 may not exist. Therefore, when the own vehicle sound is not able to be suppressed in the drive assist system, the drive assist level is decreased compared to the case where the own vehicle sound is able to be suppressed. For example, when the vehicle state of the current own vehicle may not be changed to the EV travel state during the operation of the engine and the own vehicle sound is not able to be suppressed, the drive assist system performs a drive assist at a level weaker than the case where the vehicle state of the own vehicle is the EV travel state (that is, the vehicle state of the own vehicle is a vehicle state where the own vehicle sound is suppressed). Further, when the vehicle state of the current own vehicle may not be changed to the engine stop state during the operation of the engine and the own vehicle sound is not able to be suppressed, the drive assist system performs a drive assist at a level weaker than the case where the vehicle state of the own vehicle is the engine stop state (that is, the vehicle state of the own vehicle is a vehicle state where the own vehicle sound is suppressed).

Here, the weak level drive assist indicates, for example, a drive assist which stops any one of drive assists including the display on the display unit 61 and the alarm sound output from the buzzer unit 62 in the alarm device 60 used to perform the drive assist. In the case of this example, it is desirable to stop the output of the alarm sound from the buzzer unit 62. Further, in the case where the display unit 61 of the drive assist alarm device 60 lights a lamp at the normal level, the brightness level of the light of the lamp is decreased in the weak level drive assist compared to the normal level drive assist. Further, in the case where the light of the display unit 61 of the drive assist alarm device 60 flickers at the normal level, the flickering cycle in the weak level drive assist is set to be slower than that of the normal level drive assist.

Figure 13:
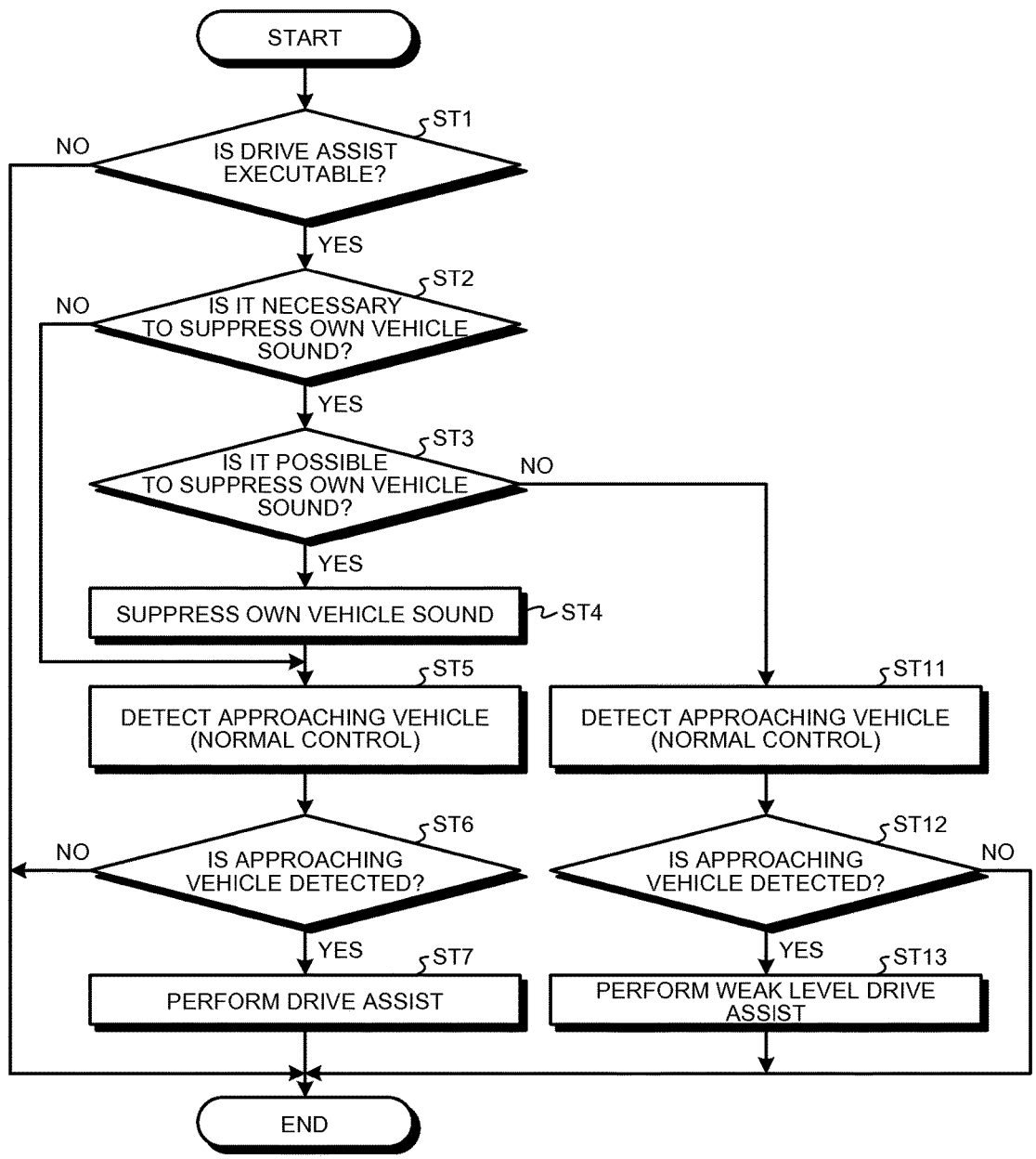
FIG. 13 is a flowchart illustrating a calculation process of a third modified example.

When it is determined that the own vehicle sound is not able to be suppressed in step ST3 as illustrated in the flowchart of FIG. 13, the approaching vehicle detection apparatus and the drive assist system performs the control for detecting the approaching vehicle 96 based on the sound information detected in step ST5 without suppressing the own vehicle sound (step ST11).

The drive assist control unit 1*f* determines whether the approaching vehicle 96 with respect to the own vehicle is detected (step ST12). The drive assist control unit 1*f* makes an end determination that the drive assist control ends when the approaching vehicle 96 is not detected. Meanwhile, when the approaching vehicle 96 is detected, the drive assist control unit 1*f* performs the weak level drive assist based on the approaching vehicle 96 (step ST13).

In this way, since the approaching vehicle detection apparatus and the drive assist system of the modified example actually suppress the own vehicle sound when the current vehicle state is a vehicle state where the own vehicle sound needs to be suppressed and the current vehicle state is a vehicle state where the own vehicle sound is able to be suppressed, the determination precision for the approaching vehicle 96 is high, and hence it is possible to perform a highly precise drive assist in response to the existence of the approaching vehicle 96 with high determination precision. Meanwhile, since the approaching vehicle detection apparatus and the drive assist system perform a drive assist in which a drive assist level is lower than the case where the reliability is high and the trouble on the driver is little when the reliability of the detection result for the approaching vehicle 96 is common, it is possible to solve the trouble on the driver caused by the low reliable drive assist and to invite the attention of the driver in consideration of the existence of the approaching vehicle 96.

In the approaching vehicle detection apparatus and the drive assist system, a highly precise drive assist is switched due to the suppression of the own vehicle sound when the current vehicle state becomes a drive state where the own vehicle sound of the own vehicle is able to be suppressed after the low reliable drive assist is performed.

[Fourth Modified Example]

Figure 14:
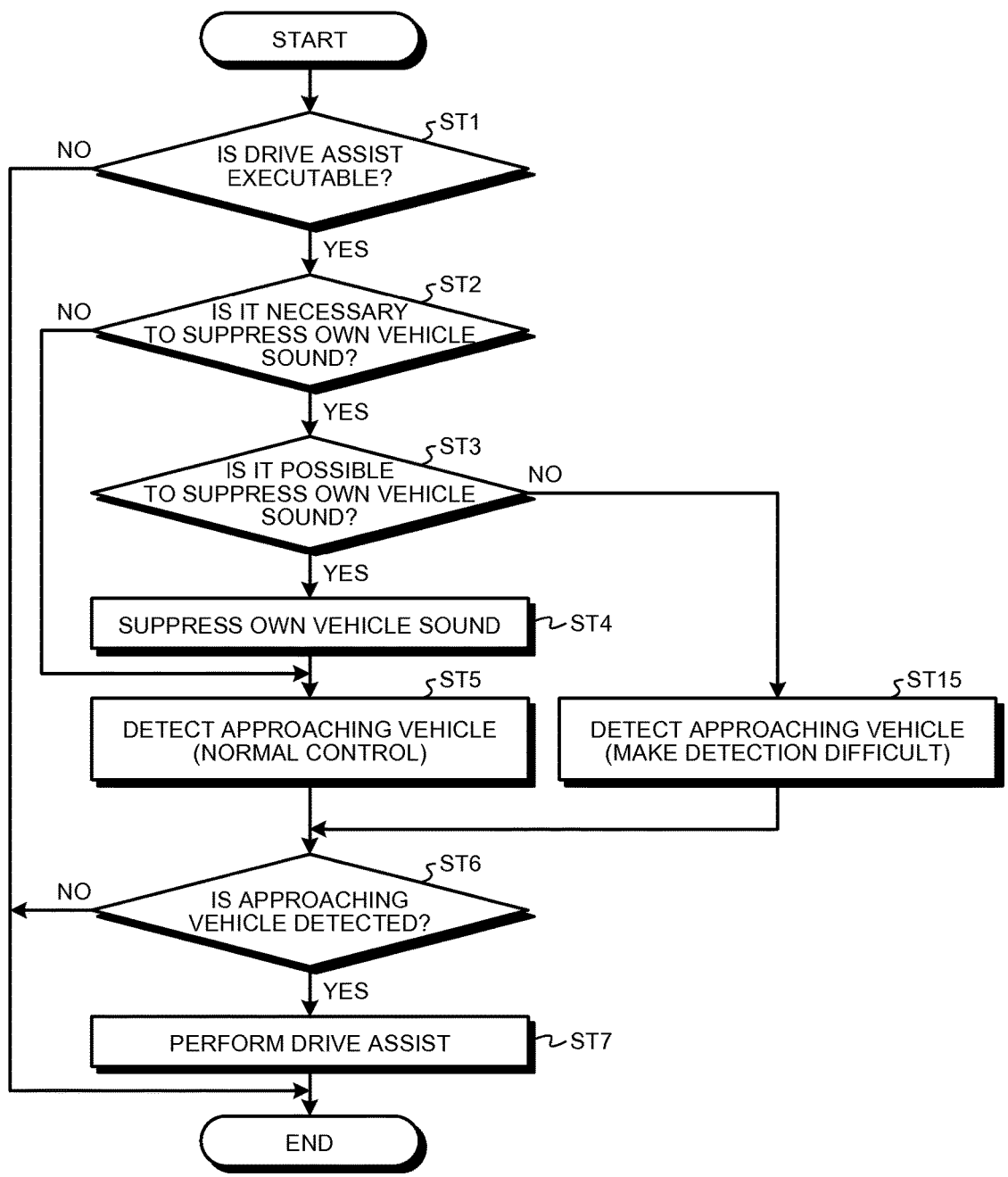
FIG. 14 is a flowchart illustrating a calculation process of a fourth modified example.

Even when the own vehicle sound is not able to be suppressed, the drive assist system of the third modified example may invite the attention of the driver so as to notify the existence of the approaching vehicle 96 by decreasing the drive assist level in the drive assist. When it is determined that the own vehicle sound is not able to be suppressed in step ST3 as illustrated in the flowchart of FIG. 14, the approaching vehicle detection apparatus and the drive assist system of the modified example, the control for detecting the approaching vehicle 96 in which the approaching vehicle 96 is not easily detected compared to the case where the own vehicle sound is able to be suppressed (step ST15). That is, in the approaching vehicle detection apparatus and the drive assist system, a determination that the approaching vehicle 96 exists is not easily made compared to the case where the own vehicle sound is able to be suppressed when the own vehicle sound is not able to be suppressed. When the existence of the approaching vehicle 96 is admitted under the circumstance in which a determination that the approaching vehicle 96 exists is not easily made, the possibility of the determination that the approaching vehicle 96 exists is low compared to the case where the own vehicle sound is able to be suppressed, but the reliability for the existence of the approaching vehicle 96 is high compared to the case where any countermeasure is not prepared. Thus, in the approaching vehicle detection apparatus and the drive assist system, a drive assist may be performed when there is a high possibility that the approaching vehicle 96 exists even in the case where the own vehicle sound is not able to be suppressed.

Specifically, in the approaching vehicle detection apparatus and the drive assist system, a determination that the approaching vehicle 96 exists is not easily made compared to the case where the vehicle state of the own vehicle is the EV travel state (the case where the vehicle state of the own vehicle is a vehicle state where the own vehicle sound is suppressed) when the vehicle state of the current own vehicle may not be changed to the EV travel state during the operation of the engine and the own vehicle sound is not able to be suppressed. Further, in the approaching vehicle detection apparatus and the drive assist system, a determination that the approaching vehicle 96 exists is not easily made compared to the case where the vehicle state of the own vehicle is the engine stop state (the case where the vehicle state of the own vehicle is a vehicle state where the own vehicle sound is suppressed) when the vehicle state of the current own vehicle may not be changed to the engine stop state during the operation of the engine and the own vehicle sound is not able to be suppressed.

For example, here, a correction threshold value P1 (>P0) is obtained for the comparison with the power P of the sound information, and it is determined whether the sound source (the traveling other vehicle) exists by the comparison thereof. The correction threshold value P1 is calculated based on the vehicle state of the own vehicle such as the vehicle speed or the engine speed of the own vehicle. For example, when the vehicle speed of the own vehicle is high, it is considered that the own vehicle sound caused by the road noise or the like is higher than the case where the vehicle speed of the own vehicle is low. Therefore, the correction threshold value P1 may be calculated so that the correction threshold value becomes larger as the vehicle speed becomes higher. Further, when the engine speed is high, it is considered that the own vehicle sound is higher than the case where the engine speed is low. Therefore, the correction threshold value P1 becomes larger as the engine speed becomes higher.

Figure 15:
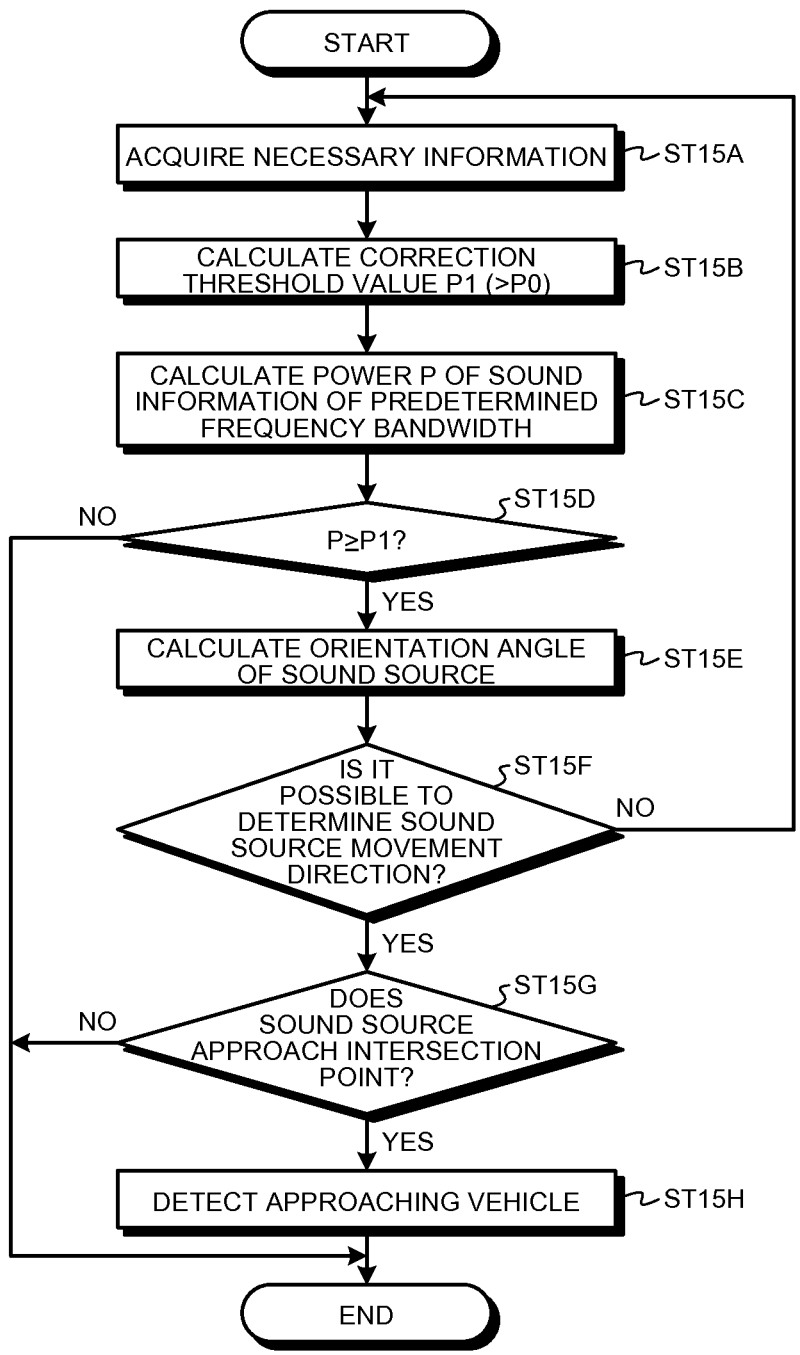
FIG. 15 is a flowchart illustrating an approaching vehicle detection control of the fourth modified example.

The control for detecting the approaching vehicle 96 in step ST15 when the own vehicle sound is not able to be suppressed will be described based on the flowchart of FIG. 15.

Figure 9:
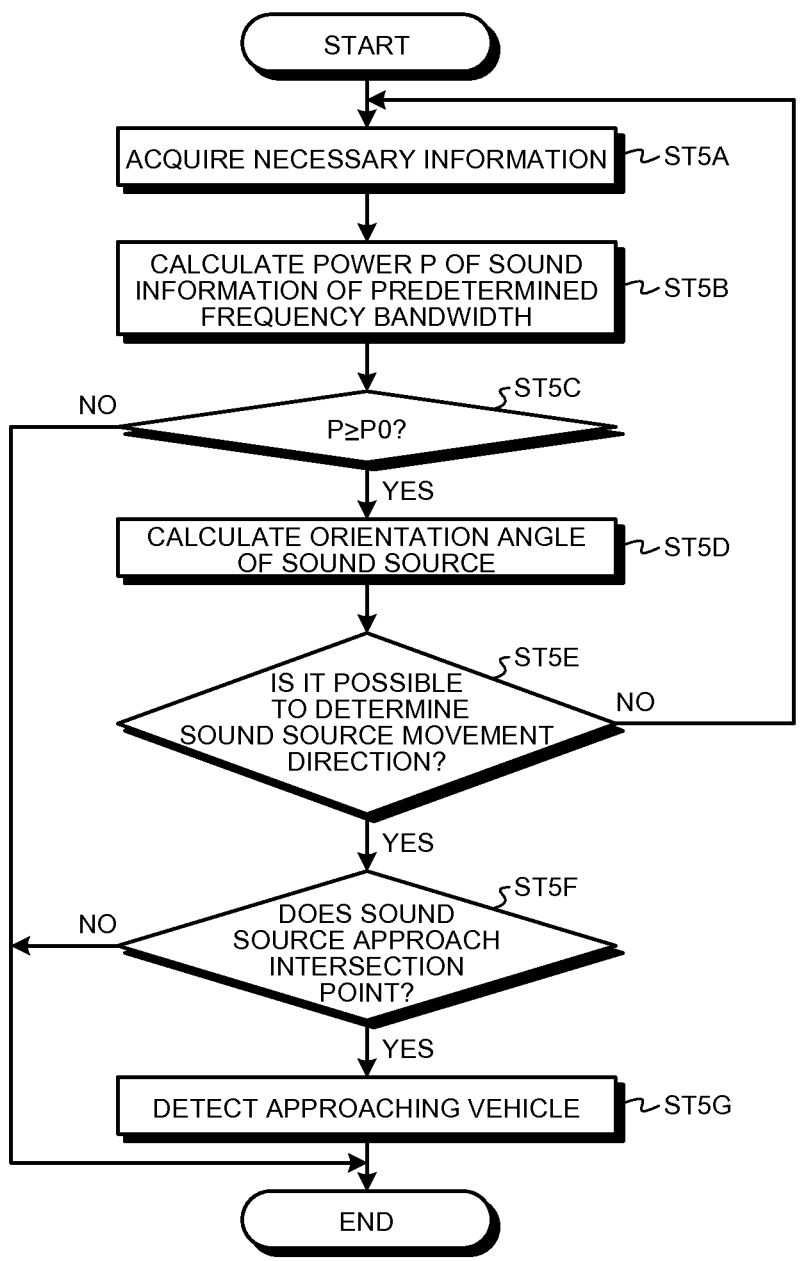
FIG. 9 is a flowchart illustrating an approaching vehicle detection control.

As illustrated in step ST5A of FIG. 9, the approaching vehicle determination unit 1*e* acquires information necessary for the control for detecting the approaching vehicle 96 (step ST15A). In step ST15A, the current vehicle speed of the own vehicle and the current engine speed are obtained when the engine is under operation.

The approaching vehicle determination unit 1*e* calculates the correction threshold value P1 based on the current vehicle speed or the engine speed of the own vehicle (step ST15B). Further, as illustrated in step ST5B of FIG. 9, the approaching vehicle determination unit 1*e* calculates the power P of the sound information of the predetermined frequency bandwidth (step ST15C).

The approaching vehicle determination unit 1*e* compares the power P with the correction threshold value P1 (step ST15D). When the power P is equal to or larger than the correction threshold value P1, the approaching vehicle determination unit 1*e* determines that the sound source (the traveling other vehicle) exists. Meanwhile, when the power P is smaller than the correction threshold value P1, the approaching vehicle determination unit determines that the sound source (the approaching vehicle 96) does not exist, and hence makes an end determination that the approaching vehicle detection control ends. This determination is performed for each sound source detection device 52.

In step ST15D, since the power P is compared with the correction threshold value P1 larger than the threshold value P0 when the own vehicle sound does not need to be suppressed or the own vehicle sound is suppressed, there is a high possibility that the sound source (the traveling other vehicle) is detected compared to the case where the threshold value P0 is used herein.

When the existence of the sound source (the traveling other vehicle) is detected, the approaching vehicle determination unit 1e determines whether the approaching vehicle 96 exists by performing the calculation processes similar to step ST5D to step ST5G of FIG. 9 (step ST15E to step ST15H).

In this way, in the approaching vehicle detection apparatus and the drive assist system of the modified example, since the own vehicle sound is actually suppressed when the current vehicle state is a vehicle state where the own vehicle sound needs to be suppressed and the current vehicle state is a vehicle state where the own vehicle sound is able to be suppressed, the determination precision for the approaching vehicle 96 is high, and hence it is possible to perform a highly precise drive assist in response to the existence of the approaching vehicle 96 with high determination precision. Meanwhile, in the approaching vehicle detection apparatus and the drive assist system, the low reliable detection for the approaching vehicle 96 is suppressed by making the detection for the approaching vehicle 96 difficult when the own vehicle sound is not able to be suppressed. For this reason, it is possible to solve the trouble on the driver caused by the low reliable drive assist and to invite the attention of the driver with respect to the high possibility of the existence of the approaching vehicle 96.

[Fifth Modified Example]

In the approaching vehicle detection apparatuses and the drive assist systems of the above-described example and the first to fourth modified examples, the sound generated from the own vehicle is decreased so as to suppress the own vehicle sound, and then the approaching vehicle 96 is detected based on the detected sound information. The approaching vehicle detection apparatus and the drive assist system of the modified example suppress the own vehicle sound on the detection signal by using the known program of the field of the invention without actually decreasing the sound generated from the own vehicle. As the program, a program adopting a noise suppression algorithm, a program adopting a noise removal algorithm, or the like is considered.

Figure 16:
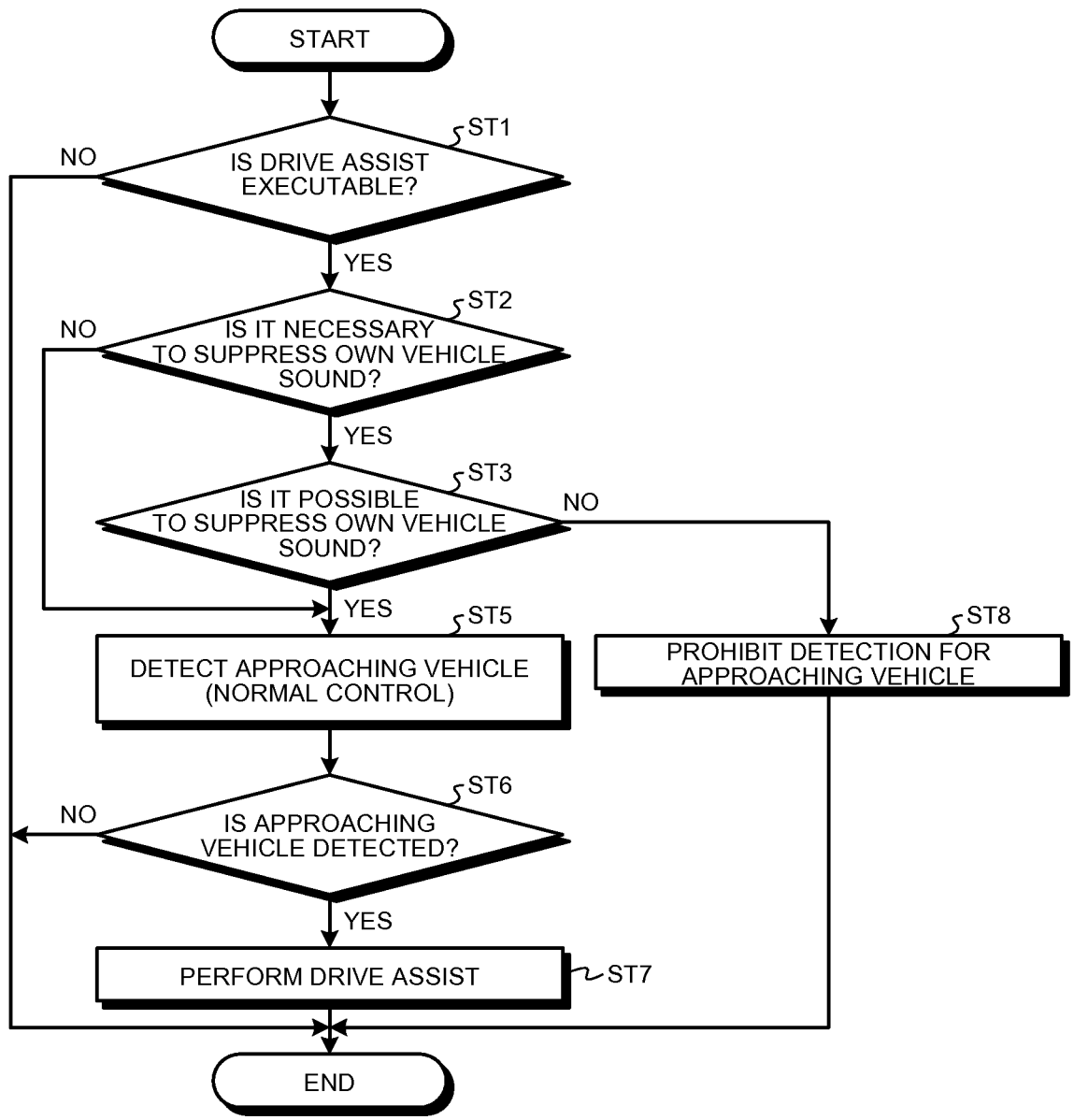
FIG. 16 is a flowchart illustrating a calculation process of a fifth modified example.
Figure 17:
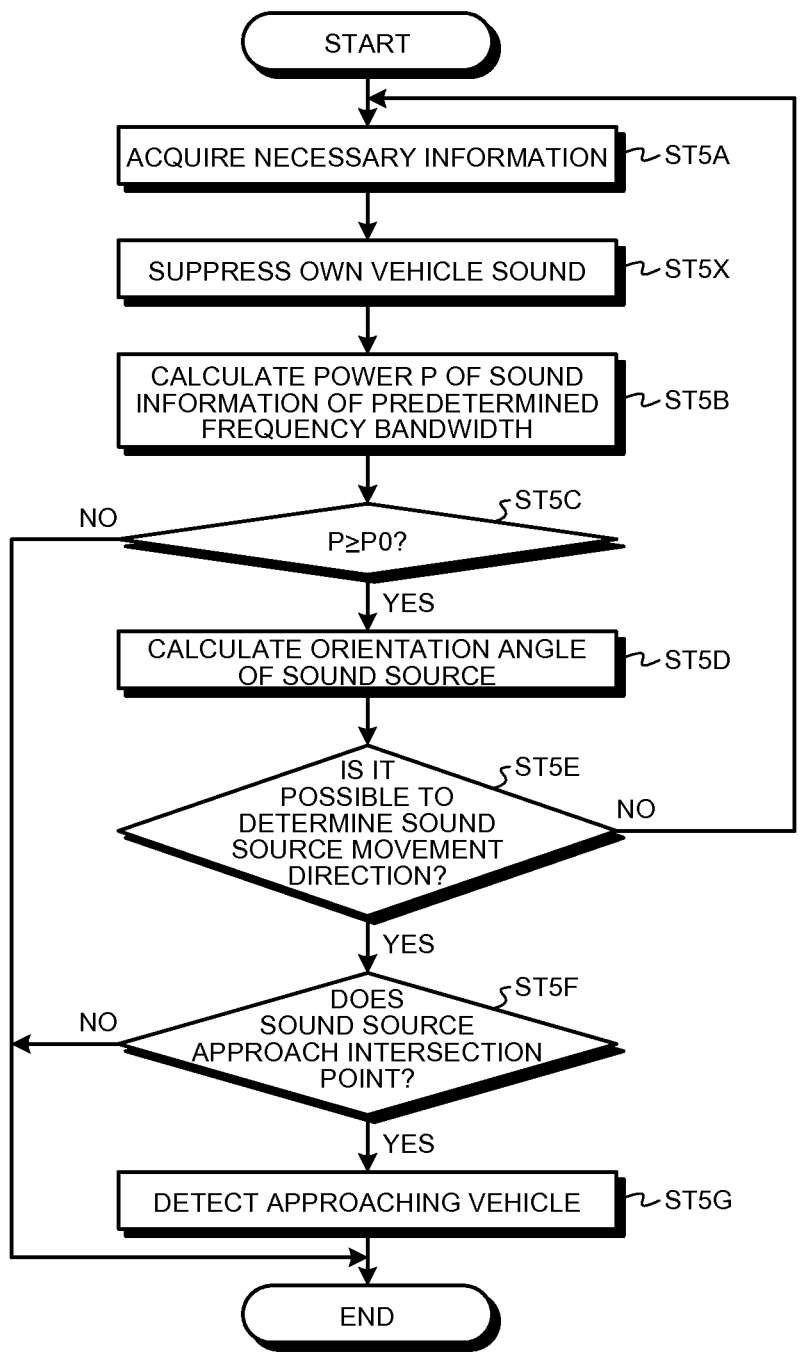
FIG. 17 is a flowchart illustrating an approaching vehicle detection control of the fifth modified example.

A determination on whether the sound source is the target approaching vehicle and a drive assist based on the determination will be described based on the flowcharts of FIGS. 16 and 17. Here, a calculation process based on FIG. 8 of the above-described example will be described as an example. Furthermore, the calculation process may be performed based on FIG. 9 of the example or the first to third modified examples. Thus, the description thereof will be omitted.

The approaching vehicle detection apparatus and the drive assist system of the modified example perform the calculation processes of step ST1 to step ST3 similarly to the example. Then, when it is determined that the own vehicle sound is able to be suppressed in step ST3, the approaching vehicle detection apparatus and the drive assist system perform the control for detecting the approaching vehicle 96 by the approaching vehicle determination unit 1e (step ST5). The own vehicle sound is suppressed during the detection control as illustrated in the flowchart of FIG. 17.

The approaching vehicle determination unit 1e acquires the information necessary for the control for detecting the approaching vehicle 96 similarly to the example (step ST5A).

The approaching vehicle determination unit 1e extracts the detection signal of the predetermined frequency bandwidth from the detection signal of the sound source detection device 52, and suppresses the own vehicle sound by the above-described program from the sound information of the predetermined frequency bandwidth (step ST5X).

The approaching vehicle determination unit 1e calculates the power P of the sound information of the predetermined frequency bandwidth in which the own vehicle sound is suppressed (step ST5B), performs the calculation processes of step ST5C to step ST5G similarly to the example, and determines whether the approaching vehicle 96 exists.

The approaching vehicle detection apparatus and the drive assist system of the modified example suppress the own vehicle sound by the program without actually suppressing the sound generated from the own vehicle when the current vehicle state is a vehicle state where the own vehicle sound needs to be suppressed and the current vehicle state is a vehicle state where the own vehicle sound is able to be suppressed, and hence equal effect as those of the example or the first to third modified examples may be obtained.

[Sixth Modified Example]

The approaching vehicle detection apparatuses and the drive assist systems of the above-described example and the first to fifth modified examples determine whether the own vehicle sound is able to be suppressed, and actually suppress the own vehicle sound or suppress the own vehicle sound by the program when the own vehicle sound is able to be suppressed. The approaching vehicle detection apparatus and the drive assist system of the modified example determine whether the approaching vehicle 96 exists without suppressing the own vehicle sound.

The approaching vehicle detection apparatus and the drive assist system of the modified example determine whether the vehicle state of the current own vehicle is a state which is suitable for performing the control for detecting the approaching vehicle 96. The vehicle state which is suitable for performing the detection control is a vehicle state (in other words, a vehicle state where the own vehicle sound is suppressed with respect to the other vehicle sound) where the own vehicle sound does not need to be performed. Specifically, the vehicle state is the engine stop state or the EV travel state. On the contrary, the vehicle state which is not suitable for performing the detection control is a vehicle state (in other words, a vehicle state where the own vehicle sound equal to the other vehicle sound is generated) where the own vehicle sound needs to be suppressed. Specifically, the vehicle state is the engine is under operation.

In the approaching vehicle detection apparatus and the drive assist system, since the own vehicle sound does not need to be suppressed when the vehicle state of the current own vehicle is a vehicle state which is suitable for performing the control for detecting the approaching vehicle 96, the own vehicle sound is not suppressed, and the control for detecting the approaching vehicle 96 is performed.

Figure 18:
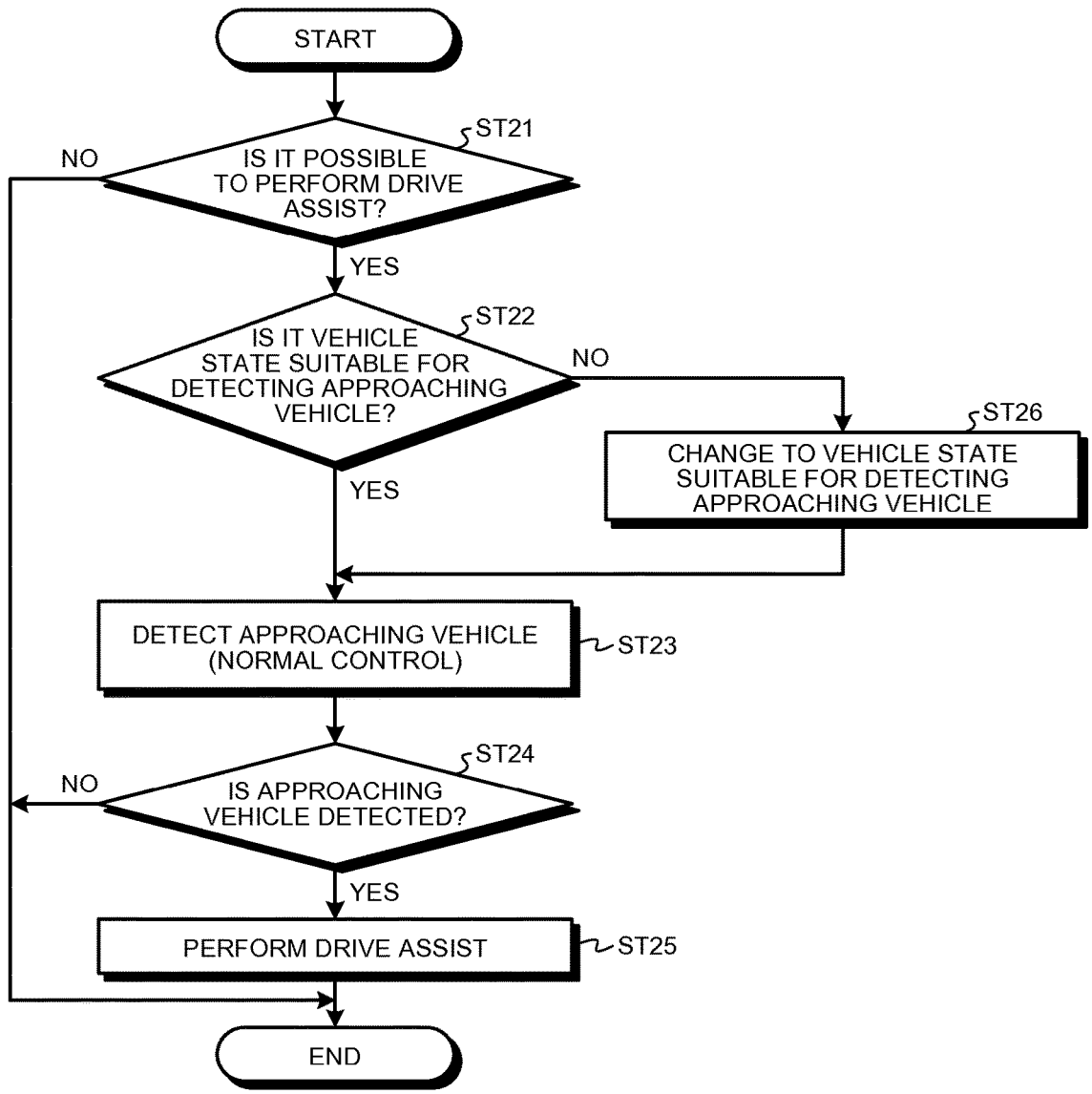
FIG. 18 is a flowchart illustrating an example of a calculation process of a sixth modified example.

For example, the assist execution determination unit 1b determines whether the drive assist may be performed based on the vehicle state of the current own vehicle similarly to step ST1 of the example or the like as illustrated in the flowchart of FIG. 18 (step ST21). The assist execution determination unit 1b makes an end determination when it is determined that the drive assist may not be performed.

When it is determined that the drive assist may be performed, the own vehicle state determination unit 1a determines whether the vehicle state of the current own vehicle is a vehicle state which is suitable for performing the control for detecting the approaching vehicle 96 (step ST22). When the current vehicle state is the engine stop state or the EV travel state, the own vehicle state determination unit 1*a* determines that the vehicle state of the current own vehicle is a vehicle state which is suitable for performing the control for detecting the approaching vehicle 96. Meanwhile, when the current vehicle state is the engine is under operation, the own vehicle state determination unit determines that the vehicle state of the current own vehicle is a vehicle state which is not suitable for performing the control for detecting the approaching vehicle 96.

When it is determined that the vehicle state is suitable for performing the control for detecting the approaching vehicle 96, the approaching vehicle determination unit 1*e* performs the control for detecting the approaching vehicle 96 similarly to step ST5 (the flowchart of FIG. 9) of the example (step ST23). Then, the drive assist control unit 1*f* determines whether the approaching vehicle 96 with respect to the own vehicle is detected (step ST24), and performs a drive assist based on the approaching vehicle 96 similarly to step ST7 of the example when the approaching vehicle is detected (step ST25).

That is, in this case, equal calculation process as those of the above-described example or the first to third modified examples is performed when it is determined that the own vehicle sound does not need to be suppressed. Thus, the approaching vehicle detection apparatus and the drive assist system of the modified example may obtain the same effect as those of the example and the like when the vehicle state of the current own vehicle is suitable for performing the control for detecting the approaching vehicle 96.

Here, when the vehicle state is suitable for performing the control for detecting the approaching vehicle 96, the approaching vehicle detection apparatus and the drive assist system of the modified example perform the same calculation process as the processes based on the approaching vehicle detection apparatuses and the drive assist systems of the above-described example and the first to third modified examples as illustrated in the flowcharts of FIGS. 19 to 22.

Meanwhile, when the vehicle state is not suitable for performing the detection control, the calculation process is different, respectively.

For example, when it is determined that the vehicle state of the current own vehicle is not suitable for performing the control for detecting the approaching vehicle 96 as illustrated in the flowchart of FIG. 18, the vehicle state changing unit 1*i* changes the vehicle state of the own vehicle to a vehicle state suitable for performing the control for detecting the approaching vehicle 96 (step ST26). When the vehicle state of the current own vehicle is the engine operation state, the vehicle state is changed to the engine stop state in the current travel mode (the engine mode or the hybrid mode) or the EV mode is switched so as to change the vehicle state to the EV travel state regardless of whether the own vehicle travels (also including a deceleration state) or stops.

In this case, the routine proceeds to step ST23 after the vehicle state is changed, and then the control for detecting the approaching vehicle 96 is performed by the approaching vehicle determination unit 1*e*. Thus, in the approaching vehicle detection apparatus and the drive assist system of the modified example, when the vehicle state of the current own vehicle is not suitable for performing the control for detecting the approaching vehicle 96, there is a possibility that the vehicle state may be changed even under the circumstance in which a desired vehicle state may not be changed to. However, since the approaching vehicle 96 is detected with high precision, a highly precise drive assist may be performed with respect to the approaching vehicle 96.

Figure 19:
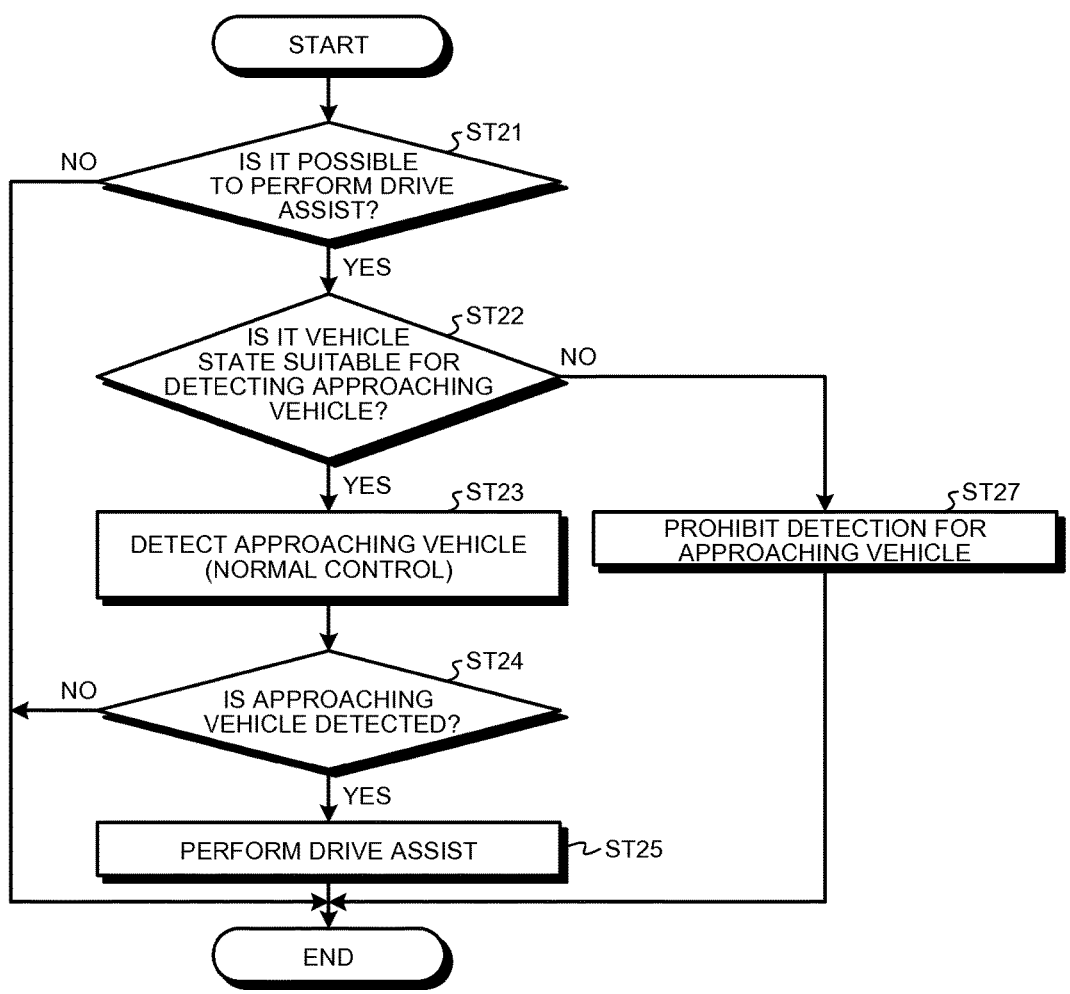
FIG. 19 is a flowchart illustrating an example of the calculation process of the sixth modified example.

Further, when the vehicle state is not suitable for performing the control for detecting the approaching vehicle 96, for example, as illustrated in the flowchart of FIG. 19, the control for detecting the approaching vehicle 96 may be prohibited similarly to step ST8 of the example (step ST27), and an end determination that the drive assist control ends may be made. Furthermore, in step ST27, the detection for the sound source may be prohibited by the sound source detection device 52. Thus, the approaching vehicle detection apparatus and the drive assist system of the modified example may obtain the same effect as the example when the vehicle state of the current own vehicle is not suitable for performing the control for detecting the approaching vehicle 96.

Figure 20:
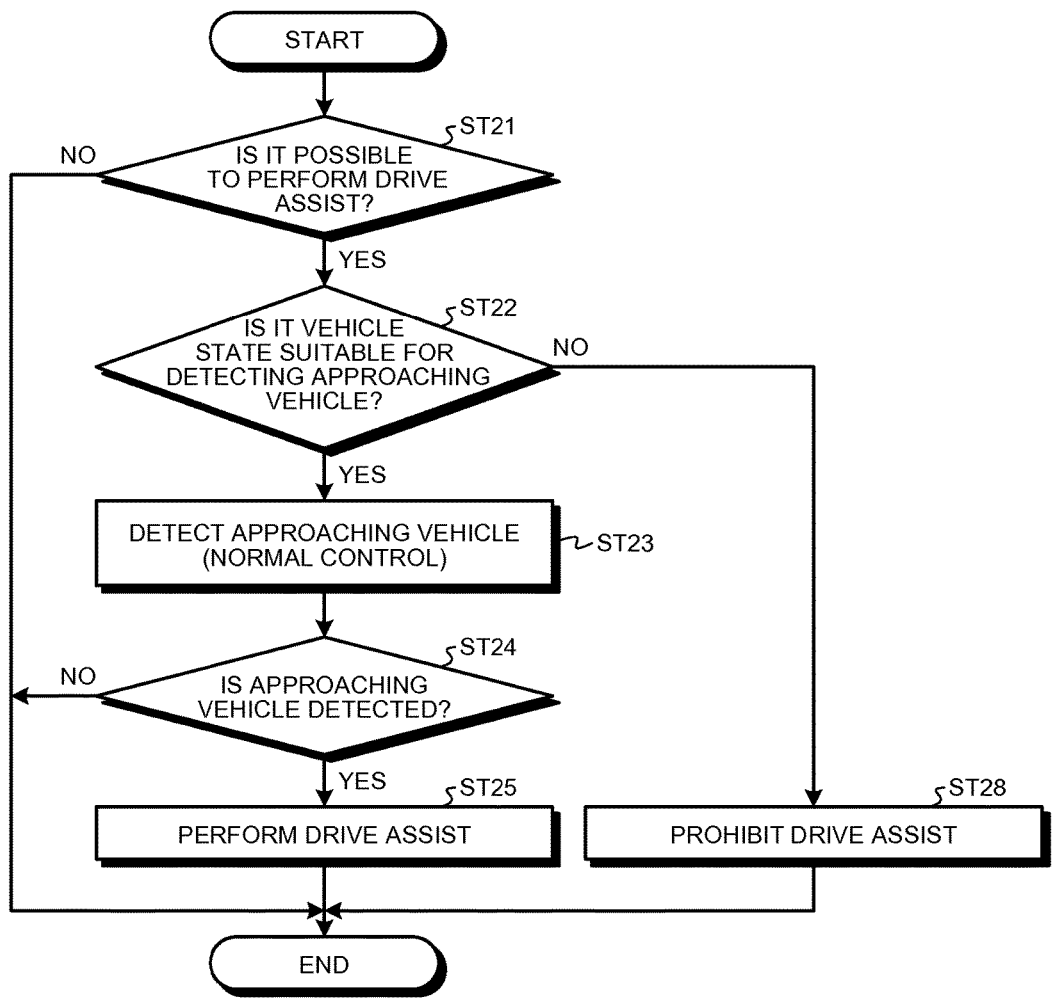
FIG. 20 is a flowchart illustrating an example of the calculation process of the sixth modified example.

Further, when the vehicle state is not suitable for performing the control for detecting the approaching vehicle 96, for example, as illustrated in the flowchart of FIG. 20, the drive assist control may be prohibited similarly to step ST9 of the first modified example (step ST28), and an end determination that the drive assist control ends may be made. Thus, the approaching vehicle detection apparatus and the drive assist system of the modified example may obtain the same effect as the first modified example when the vehicle state of the current own vehicle is not suitable for performing the control for detecting the approaching vehicle 96.

Figure 21:
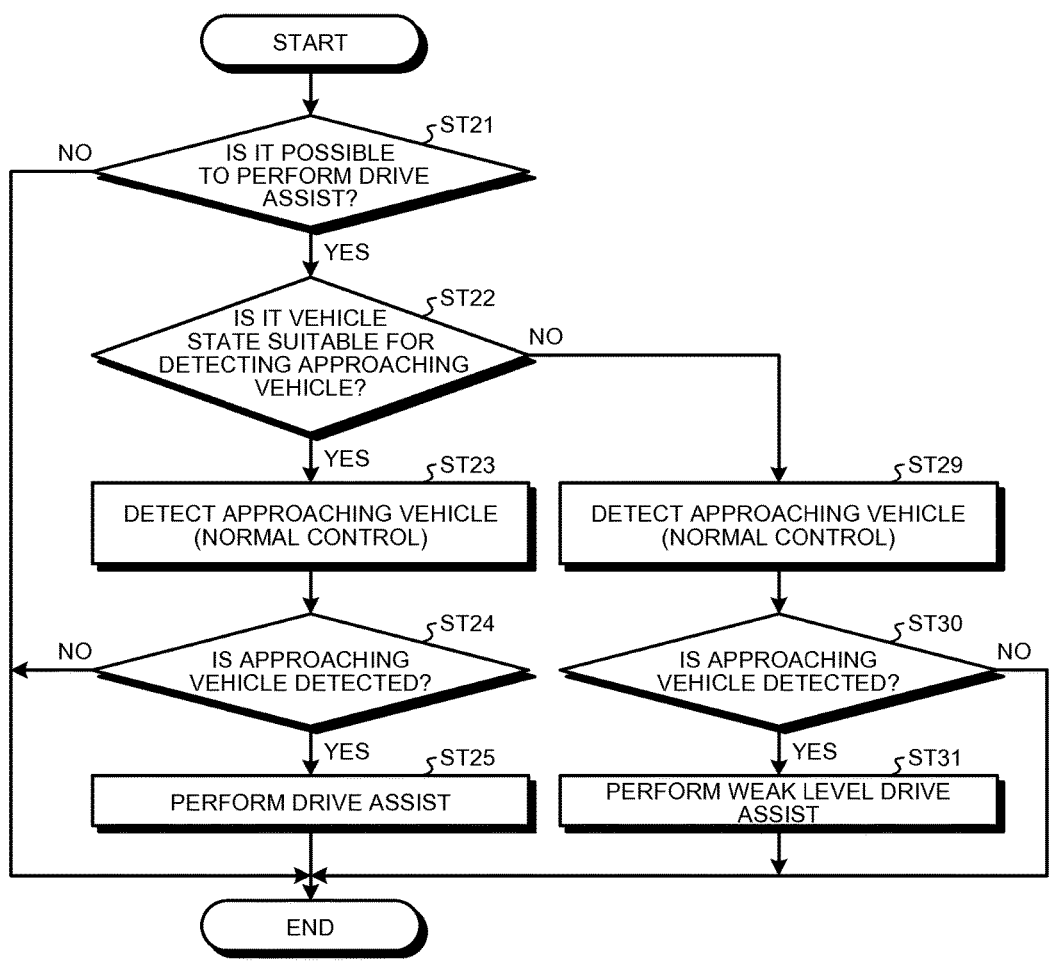
FIG. 21 is a flowchart illustrating an example of the calculation process of the sixth modified example.

Further, when the vehicle state is not suitable for performing the control for detecting the approaching vehicle 96, for example, as illustrated in the flowchart of FIG. 21, the control for detecting the approaching vehicle 96 is performed based on the detected sound information similarly to step ST11 to step ST13 of the second modified example (step ST29). Then, when a determination result is obtained in which the approaching vehicle 96 is detected in step ST30, a drive assist may be performed at a level weaker than the case where the vehicle state is suitable for performing the control for detecting the approaching vehicle 96 (step ST31). Thus, the approaching vehicle detection apparatus and the drive assist system of the modified example may obtain the same effect as the second modified example when the vehicle state of the current own vehicle is not suitable for performing the control for detecting the approaching vehicle 96.

Figure 22:
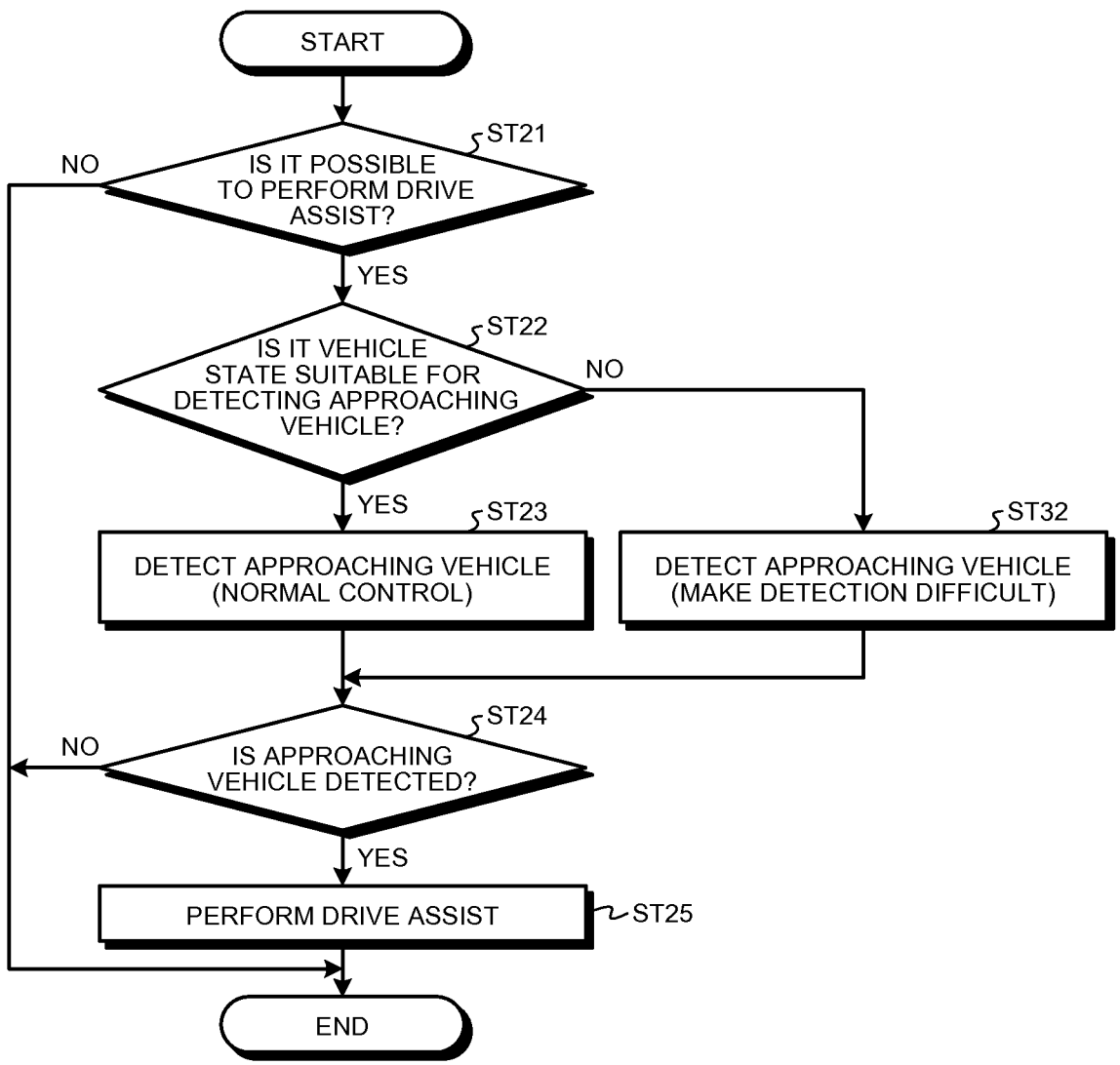
FIG. 22 is a flowchart illustrating an example of the calculation process of the sixth modified example.

Further, when the vehicle state is not suitable for performing the control for detecting the approaching vehicle 96, for example, as illustrated in the flowchart of FIG. 22, the control for detecting the approaching vehicle 96 in which the approaching vehicle 96 is not easily detected is performed compared to the case where the vehicle state is suitable for performing the control for detecting the approaching vehicle 96 similarly to step ST15 (the flowchart of FIG. 15) of the third modified example (step ST32). Thus, the approaching vehicle detection apparatus and the drive assist system of the modified example may obtain the same effect as the third modified example when the vehicle state of the current own vehicle is not suitable for performing the control for detecting the approaching vehicle 96.

Incidentally, an example has been described in which the approaching vehicle detection apparatuses and the drive assist systems of the above-described example and the first to sixth modified examples are applied to the hybrid vehicle. However, the approaching vehicle detection apparatuses and the drive assist systems may be applied only to the vehicle including only the mechanical power source (the engine) as the power source, and equal effect as the hybrid vehicle (excluding the EV travel) may be obtained.

Further, the approaching vehicle detection apparatuses and the drive assist systems of the above-described example and the first to sixth modified examples determine whether the detected sound source is the approaching vehicle 96 with respect to the own vehicle. Instead of this configuration, the approaching vehicle detection apparatus and the drive assist system may be configured to just determine whether the detected sound source is the other vehicle. Then, the drive assist system of this case may be configured to perform the drive assist in the case where the sound source is the other vehicle. In this case, it is not possible to determine whether the detected sound source is the approaching vehicle 96, but it is possible to determine whether the other vehicle exists around the own vehicle. Accordingly, it is possible to invite the attention of the driver.

REFERENCE SIGNS LIST

1 DRIVE ASSIST ECU
1a OWN VEHICLE STATE DETERMINATION UNIT
1b ASSIST EXECUTION DETERMINATION UNIT
1c IMAGING CONTROL UNIT
1d SOUND SOURCE DETECTION UNIT
1e APPROACHING VEHICLE DETERMINATION UNIT
1f DRIVE ASSIST CONTROL UNIT
1g OWN VEHICLE SOUND SUPPRESSION NECESSITY DETERMINATION UNIT
1h OWN VEHICLE SOUND SUPPRESSION DETERMINATION UNIT
1i OWN VEHICLE SOUND SUPPRESSION EXECUTION UNIT (VEHICLE STATE CHANGING UNIT)
1j DETECTION PROHIBITION UNIT
1k ASSIST PROHIBITION UNIT
2 TRAVEL CONTROL ECU
2a ENGINE CONTROL UNIT
11 ENGINE
12 ELECTRIC GENERATOR
51 IMAGING DEVICE
52 SOUND SOURCE DETECTION DEVICE
60 ALARM DEVICE
61 DISPLAY UNIT
62 BUZZER UNIT
63 MODE SWITCHING SWITCH
64 ON/OFF SWITCHING SWITCH

The invention claimed is:

1. An approaching vehicle detection apparatus comprising:
a sound information detector configured to detect sound information around an own vehicle;
a sound source detector configured to detect a sound source around the own vehicle based on the detected sound information; and
a processor configured to:
determine whether the sound source is an approaching vehicle, which approaches the own vehicle; and
determine whether a vehicle state of the own vehicle is a vehicle state which is suitable for detecting the approaching vehicle,
wherein the determination of whether the sound source is the approaching vehicle is performed when the vehicle state of the own vehicle is suitable for detecting the approaching vehicle.

2. The approaching vehicle detection apparatus according to claim 1, wherein the processor is further configured to:
change a vehicle state of the own vehicle to the vehicle state suitable for detecting the approaching vehicle when the vehicle state of the current own vehicle is not suitable for detecting the approaching vehicle,
wherein when the own vehicle sound has been suppressed determine whether the sound source detected after the suppression of the own vehicle sound is the approaching vehicle.

3. The approaching vehicle detection apparatus according to claim 2,
wherein the case which is not suitable for detecting the approaching vehicle refers to a case where the current vehicle state of the own vehicle is an engine operation state, and the case which is suitable for detecting the approaching vehicle refers to a case where the current vehicle state of the own vehicle is an engine stop state, a case where the own vehicle travels only by a power of a motor, or a case where the own vehicle is able to travel only by the power of the motor.

4. The approaching vehicle detection apparatus according to claim 1, wherein the processor is further configured to:
prohibit the detection for the sound source or the determination on whether the approaching vehicle exists when a current vehicle state of the own vehicle is not suitable for detecting the approaching vehicle.

5. The approaching vehicle detection apparatus according to claim 4,
wherein the case which is not suitable for detecting the approaching vehicle refers to a case where the current vehicle state of the own vehicle is an engine operation state, and the case which is suitable for detecting the approaching vehicle refers to a case where the current vehicle state of the own vehicle is an engine stop state, a case where the own vehicle travels only by a power of a motor, or a case where the own vehicle is able to travel only by the power of the motor.

6. The approaching vehicle detection apparatus according to claim 1,
wherein when a current vehicle state of the own vehicle is not suitable for detecting the approaching vehicle, a determination that the approaching vehicle exists is not easily made compared to the case where the vehicle state is suitable for detecting the approaching vehicle.

7. The approaching vehicle detection apparatus according to claim 6,
wherein the case which is not suitable for detecting the approaching vehicle refers to a case where the current vehicle state of the own vehicle is an engine operation state, and the case which is suitable for detecting the approaching vehicle refers to a case where the current vehicle state of the own vehicle is an engine stop state, a case where the own vehicle travels only by a power of a motor, or a case where the own vehicle is able to travel only by the power of the motor.

8. The approaching vehicle detection apparatus according to claim 1, wherein the processor is further configured to:
perform a drive assist of the own vehicle based on the determination result; and
prohibit any one of the detection of the sound source, the determination on whether the approaching vehicle exists, and the drive assist when the current vehicle state of the own vehicle is not suitable for detecting the approaching vehicle.

9. The approaching vehicle detection apparatus according to claim 1, wherein the processor is further configured to:
perform a drive assist of the own vehicle based on the determination result,
wherein when a current vehicle state of the own vehicle is not suitable for detecting the approaching vehicle, a drive assist level is decreased compared to the case where the vehicle state is suitable for detecting the approaching vehicle.

10. The approaching vehicle detection apparatus according to claim 9,
wherein the case which is not suitable for detecting the approaching vehicle refers to a case where the current vehicle state of the own vehicle is an engine operation state, and the case which is suitable for detecting the approaching vehicle refers to a case where the current vehicle state of the own vehicle is an engine stop state, a case where the own vehicle travels only by a power of a motor, or a case where the own vehicle is able to travel only by the power of the motor.

* * * * *